United States Patent [19]
Miki et al.

[11] Patent Number: 6,094,233
[45] Date of Patent: Jul. 25, 2000

[54] VIDEO SIGNAL NOISE REDUCTION APPARATUS WITH VARIABLE S/N IMPROVING AMOUNT

[75] Inventors: Yoichiro Miki, Kawachinagano; Masanori Hamada, Kadoma; Atsushi Ishizu; Masatoshi Nakano, both of Takatsuki, all of Japan

[73] Assignee: Matsushita Electric Industrial, Osaka, Japan

[21] Appl. No.: 08/905,155

[22] Filed: Aug. 1, 1997

Related U.S. Application Data

[62] Division of application No. 08/611,666, Mar. 6, 1996, Pat. No. 5,867,228.

[30] Foreign Application Priority Data

Mar. 6, 1995 [JP] Japan ................................. 7-045620

[51] Int. Cl.[7] .................................................. H04N 5/213
[52] U.S. Cl. .................................. 348/624; 348/607
[58] Field of Search .................................. 348/607, 618, 348/624; H04N 5/21, 5/213

[56] References Cited

U.S. PATENT DOCUMENTS

| | | |
|---|---|---|
| 4,670,775 | 6/1987 | Faroudja . |
| 4,833,537 | 5/1989 | Takeuchi . |
| 4,962,426 | 10/1990 | Naoi . |
| 5,025,312 | 6/1991 | Faroudja . |
| 5,191,419 | 3/1993 | Wischermann . |
| 5,268,760 | 12/1993 | Suyama . |
| 5,272,533 | 12/1993 | Akiyama . |
| 5,278,638 | 1/1994 | Nakada . |
| 5,367,340 | 11/1994 | Spencer . |
| 5,442,407 | 8/1995 | Iu . |

FOREIGN PATENT DOCUMENTS

| | | |
|---|---|---|
| 621-732-A2 | 10/1994 | European Pat. Off. . |
| 62-22309 | 9/1979 | Japan . |
| 63-173976 | 7/1988 | Japan . |
| 1-204573 | 8/1989 | Japan . |
| 2-226874 | 9/1990 | Japan . |
| 3-236684 | 10/1991 | Japan . |
| 5-347723 | 12/1993 | Japan . |
| 2-142-204 | 1/1985 | United Kingdom . |
| 2-145-601 | 3/1985 | United Kingdom . |

OTHER PUBLICATIONS

"Digital Signal Processing For Image", pp. 115–118, Fukinuki, Nikkan Kogyo Newspaper Publisher.

*Primary Examiner*—Sherrie Hsia
*Attorney, Agent, or Firm*—Venable; Norman N. Kunitz

[57] ABSTRACT

In a noise reducer whose S/N improving amount is variable, as to such a region where image quality deterioration caused by the noise reducer becomes relatively apparent, and both a luminance level and a chroma level are low, the S/N improving amount thereof is decreased. To the contrary, as to such a picture having a dark high frequency range component and a small movement component, no control is made of the S/N improving amount by the above-described luminance level and chroma level, but the normal S/N improvement is sufficiently carried out.

5 Claims, 16 Drawing Sheets

OUTPUTS FROM YC LEVEL CIRCUIT

| Y-THRESHOLD VALUE OUTPUT | C-THRESHOLD VALUE OUTPUT | YC LEVEL CIRCUIT OUTPUTS NUMERALS INDICATED BY DECIMAL NOTATION IN PARENTHESES |
|---|---|---|
| 0 | 0 | 0 0 (0) |
| 0 | 1 | 0 1 (1) |
| 1 | 0 | 1 0 (2) |
| 1 | 1 | 1 1 (3) |

(a) S/N IMPROVING AMOUNT CONTROL SIGNAL : 0

(b) S/N IMPROVING AMOUNT CONTROL SIGNAL : 1

(c) S/N IMPROVING AMOUNT CONTROL SIGNAL : 2

(d) S/N IMPROVING AMOUNT CONTROL SIGNAL : 3

FIG. 9

OUTPUT FROM S/N IMPROVING AMOUNT
CONTROL SIGNAL PRODUCING CIRCUIT 62

NUMERALS INDICATED BY DECIMAL NOTATION IN PARENTHESES

| OUTPUT FROM YC LEVEL CIRCUIT | OUTPUT FROM HIGH FREQUENCY RANGE COMPONENT THRESHOLD VALUE CIRCUIT | OUTPUT FROM LIMITER CONTROL CIRCUIT 60 |
|---|---|---|
| 0 0   (0) | 0 | 0 0   (0) |
| 0 1   (1) | 0 | 0 1   (1) |
| 1 0   (2) | 0 | 1 0   (2) |
| 1 1   (3) | 0 | 1 1   (3) |
| 0 0   (0) | 1 | 1 1   (3) |
| 0 1   (1) | 1 | 1 1   (3) |
| 1 0   (2) | 1 | 1 1   (3) |
| 1 1   (3) | 1 | 1 1   (3) |

FIG. 12

OUTPUT FROM S/N IMPROVING AMOUNT
CONTROL SIGNAL PRODUCING CIRCUIT 118

NUMERALS INDICATED BY DECIMAL NOTATION IN PARENTHESES

| OUTPUT FROM YC LEVEL CIRCUIT | YC LEVEL CONTROLLING /FIXING SIGNAL | OUTPUT FROM LIMITER CONTROL CIRCUIT 118 |
|---|---|---|
| 0 0   (0) | 0 | 0 0   (0) |
| 0 1   (1) | 0 | 0 1   (1) |
| 1 0   (2) | 0 | 1 0   (2) |
| 1 1   (3) | 0 | 1 1   (3) |
| 0 0   (0) | 1 | 1 1   (3) |
| 0 1   (1) | 1 | 1 1   (3) |
| 1 0   (2) | 1 | 1 1   (3) |
| 1 1   (3) | 1 | 1 1   (3) |

VIDEO SIGNAL NOISE REDUCTION APPARATUS WITH VARIABLE S/N IMPROVING AMOUNT

This is a Division of application Ser. No. 08/611,666 filed Mar. 6, 1996, U.S. Pat. No. 5,867,228.

BACKGROUND OF THE INVENTION

1. Field of the Invention

The present invention relates to a noise reduction apparatus for preferably removing noise components contained in a video signal without deteriorating the original video signal.

2. Description of the Related Art

As noise reduction apparatuses, there are cyclic type noise reducers, noncyclic type noise reducers, and noise reducers employing coring circuits. These cyclic and noncyclic type noise reduces utilize such characteristics that a video signal owns high self-correlation along a temporal direction, whereas a noise component owns substantially no self-correlation. The last-mentioned noise reducers clip a high frequency very small component to improve S/N.

The typical noncyclic type S/N improving apparatus and the typical cyclic type S/N improving apparatus are described in, for instance, Japanese publication "Digital Signal Processing for Image" written by Fukinuki and published by NIKKAN KOGYO Newspaper Publisher, pages 115 to 118. FIG. 18 is a schematic block diagram showing the arrangement of this conventional IIR type noise reduction apparatus. Also, FIG. 19 represents one typical characteristic example of the nonlinear limiter 503 shown in FIG. 18.

In the conventional cyclic type noise reduction apparatus with the above-described arrangement, when the frame difference signal is small, the nonlinear limiter 503 returns this frame difference signal to the original signal while this frame difference signal is regarded as noise. When the frame difference signal is large, the nonlinear limiter 503 performs no process operation while this frame difference signal is regarded as no movement. As a consequence, the S/N ratio of the still image region is improved. The larger the value of symbol "a" shown in FIG. 19 becomes, the wider the range to be processed by the noise reduction becomes. Therefore, the S/N improving amount is increased. However, since the movement component is also smoothed, the leaving picture trail will occur.

FIG. 20 is another block diagram showing the arrangement of the conventional noise reduction apparatus with employment of the coring circuit. The noise reduction apparatus with using the coring circuit shown in FIG. 20 is one example of such a noise reducer without the processing operation along the temporal (time base) direction within the same field. One example of the nonlinear limiter 515 indicated in FIG. 20 is represented in FIG. 19.

In the conventional noise reduction apparatus using the coring circuit having the above-described arrangement, when the high frequency range component of the input picture (image) signal is small, this picture signal is regarded as noise and thus is returned to the original signal by the nonlinear limiter 515. To the contrary, when the high frequency range component of the input picture signal is large, this picture signal is regarded as the original signal component, and therefore no process operation is carried out by the nonlinear limiter 515. As a result, the S/N ratio is improved. The larger the value of symbol "a" in FIG. 19 becomes, the wider the range to be processed by the noise reduction becomes. Accordingly, the S/N improving amount is increased. However, a large blur of the picture will occur in the high frequency range component of the original video (picture) signal.

As described above, however, in the arrangement of the noise reduction apparatus with utilizing the correlation along the temporal (time base) direction, since the decision as to whether the input video signal corresponds to the movement signal or noise is made based upon the level of the inter frame difference signal (i.e., a difference between one frame signal and the subsequent frame signal), such an input video signal containing the movement components having the small amplitudes is judged as noise. Thus, the blur would occur in the picture with very small movement. Also, in the above-described conventional noise reduction apparatus with employment of the coring circuit, the judgement between the high frequency range component and the noise is established based upon the level of the high frequency range component. As a consequence, with respect to such a video signal containing a high frequency range component having a small amplitude, this high frequency range component is judged as noise. Thus, the blur would occur in a very small signal component of the original video signal.

Also, in the video system employing the nonlinear calculating means for suppressing the low level signal of the video signal, it is rather difficult to separate the video signal from the noise in the low-level region, as compared with the high level region. In particular, in a natural image such as a scene, there are large possibilities that fine signal components are contained in a region where a brightness level is low and a color level is low. Under such a circumstance, there is such a problem of how to minimize the blur so as to improve the S/N ratio.

That is, in accordance with the arrangement of the conventional noise reduction apparatus, since the discrimination between the signal and the noise in the low level signal range is not sufficiently performed, the blur would occur in the video signal. To suppress these blurs, the value of symbol "a" in the characteristic of the nonlinear shown in FIG. 19 is made small, and the S/N improving amount should be decreased. Therefore, there is another problem that the S/N improving effects in the still image region and the flat image portion are lowered.

SUMMARY OF THE INVENTION

An object of the present invention is to provide a noise reduction apparatus capable of suppressing the blur of the picture caused by movement in a region whose signal level is low, and also another blur caused by a high frequency range component in a region whose signal level is low.

To achieve the above-described object, a first invention is featured by such a noise reduction apparatus comprising:

noise reducing means for inputting therein i.e., receiving a video signal and whose S/N improving amount is variable with respect to the inputted video signal; and S/N improving amount control signal producing means for receiving said video signal and for outputting a signal every pixel in response to at least one of inputted luminance signal level and an absolute value level of a chroma signal, and wherein:

the S/N improving amount of said noise reducing means is controlled by the output from said S/N improving amount control signal producing means.

A second invention is featured by such a noise reduction apparatus comprising:

noise reducing means for receiving a video signal and whose S/N improving amount is variable with respect to the inputted video signal;

high frequency range extracting means for receiving said video signal to extract a high frequency range component of said video signal; and S/N improving amount control signal producing means for receiving said video signal and for outputting a signal corresponding to at least one of a luminance signal level and an absolute value level of a chroma signal; and wherein:

the output of said S/N improving amount control signal producing means is controlled by the output of said high frequency range component extracting means; and said S/N improving amount control signal producing means outputs a control signal used to reduce the S/N improving amount of said noise reducing means when the luminance signal level and the absolute value level of the chroma signal are low.

A third invention is featured by such a noise reduction apparatus comprising:

noise reducing means for receiving a video signal and whose S/N improving amount is variable with respect to the inputted video signal;

S/N improving amount control signal producing means for receiving said video signal and for outputting a signal corresponding to at least one of a luminance signal level and an absolute value level of a chroma signal;

low level signal detecting means for receiving a luminance signal to thereby output such a luminance signal having a level lower than a preselected value;

high frequency range component detecting means for receiving said video signal to detect a high frequency range component of said video signal;

logic means for receiving both the output from said low level signal detecting means and the output from said high frequency range component detecting means and for outputting a signal only when the input signal is a low level and the high frequency range component is detected;

a counter for receiving the output from said logic means so as to count the quantity of the output signals from the logic means in a preselected video section; and threshold value means for receiving the output from said counter and for comparing said output from the counter with a preselected value to thereby output a large/small relationship; wherein:

said S/N improving amount control signal producing means outputs a control signal used to reduce the S/N improving amount of said noise reducing means when the luminance signal level and the absolute value level of the chroma signal are low, and the output of said S/N improving amount control signal producing means is controlled based upon the output of the threshold value means so as to increase the S/N improving amount.

A fourth invention is featured by such a noise reduction apparatus comprising:

noise reducing means for receiving a video signal and whose S/N improving amount is variable with respect to the inputted video signal;

S/N improving amount control signal producing means for receiving said video signal and for outputting a signal corresponding to at least one of a luminance signal level and an absolute value level of a chroma signal;

low level signal detecting means for receiving a luminance signal to thereby output such a luminance signal having a level lower than a preselected value;

a first counter for receiving the output from said low level signal detecting means and for counting the quantity of pixels whose level is judged as a low level within a preselected video section;

high frequency range component detecting means for receiving said video signal to detect a high frequency range component of said video signal;

logic means for receiving both the output from said low level signal detecting means and the output from said high frequency range component detecting means and for outputting a signal when the input signal is a low level and the high frequency range component is detected;

a second counter for receiving the output from said logic means so as to count a quantity of the output signal from said logic means within a preselected video section;

dividing means for receiving both the output from said first counter and the output from said second counter and for calculating the ratio of both the outputs from said first and second counters; and threshold value means for receiving the output from said dividing means and for comparing the output from said dividing means with a predetermined value to thereby output a large/small relationship; and wherein:

said S/N improving amount control signal producing means outputs a control signal used to reduce the S/N improving amount of said noise reducing means when the luminance signal level and the absolute value level of the chroma signal are low, and the output of said S/N improving amount control signal producing means is controlled based upon the output of the threshold value means so as to increase the S/N improving amount.

A first invention is featured by such a noise reduction apparatus comprising:

noise reducing means for receiving a video signal and whose S/N improving amount is variable with respect to the inputted video signal;

S/N improving amount control signal producing means for receiving said video signal and for outputting a signal corresponding to at least one of a luminance signal level and an absolute value level of a chroma signal;

low level signal detecting means for receiving a luminance signal to thereby output such a luminance signal having a level lower than a preselected value;

movement detecting means for detecting a movement within at least one field period;

logic means for receiving both the output from said low level signal detecting means and the output from said movement detecting means and for outputting a signal only when the input signal is a low level and contains the movement;

a counter for receiving the output from said logic means so as to count the quantity of the output signals from the logic means in a preselected video section; and threshold value means for receiving the output from said counter and for comparing said output from the counter with a preselected value to thereby output a large/small relationship; and wherein:

said S/N improving amount control signal producing means outputs a control signal used to reduce the S/N improving amount of said noise reducing means when the luminance signal level and the absolute value level of the chroma signal are low; and the output from the S/N improving amount control signal producing means is controlled so as to increase the S/N improving amount based on the output from said threshold value means.

A sixth invention is featured by a noise reduction apparatus comprising:

noise reducing means for receiving a video signal and whose S/N improving amount is variable with respect to the inputted video signal;

S/N improving amount control signal producing means for receiving said video signal and for outputting a signal corresponding to at least one of a luminance signal level and an absolute value level of a chroma signal;

low level signal detecting means for receiving a luminance signal to thereby output such a luminance signal having a level lower than a preselected value;

a first counter for receiving the output from said low level signal detecting means and for counting the quantity of pixels whose level is judged as a low level within a preselected video section;

movement detecting means for detecting a movement within at least one field period;

logic means for receiving both the output from said low level signal detecting means and the output from said movement detecting means and for outputting a signal only when the input signal is a low level and contains the movement;

a second counter for receiving the output signals from said logic means so as to count the quantity of the output signals from said logic means within a preselected video section;

dividing means for receiving both the output from said first counter and the output from said second counter to thereby calculate a ratio of both the outputs from said first and second counters; and threshold value means for receiving the output from said dividing means and for comparing the output from said dividing means with a predetermined value to thereby output a large/small relationship; and wherein:

said S/N improving amount control signal producing means outputs a control signal used to reduce the S/N improving amount of said noise reducing means when the luminance signal level and the absolute value level of the chroma signal are low; and the output from the S/N improving amount control signal producing means is controlled so as to increase the S/N improving amount based on the output from said threshold value means.

A seventh invention is featured by such a noise reduction apparatus comprising:

noise reducing means for receiving a video signal and whose S/N improving amount is variable with respect to the inputted video signal;

S/N improving amount control signal producing means for receiving said video signal and for outputting a signal corresponding to at least one of a luminance signal level and an absolute value level of a chroma signal;

low level signal detecting means for receiving a luminance signal to thereby output such a luminance signal having a level lower than a preselected value;

movement detecting means for detecting a movement within at least one field period;

high frequency range component detecting means for receiving said video signal to detect a high frequency range component of said video signal;

logic means for receiving the output from said low level signal detecting means, the output from said movement detecting means and the output from said high frequency range component detecting means and for outputting a signal only when the input signal is a low level and contains the movement;

a counter for receiving the output from said logic means so as to count the quantity of the output signals from the logic means in a preselected video section; and threshold value means for receiving the output from said counter and for comparing said output from the counter with a preselected value to thereby output a large/small relationship; wherein:

said S/N improving amount control signal producing means outputs a control signal used to reduce the S/N improving amount of said noise reducing means when the luminance signal level and the absolute value level of the chroma signal are low; and the output from the S/N improving amount control signal producing means is controlled so as to increase the S/N improving amount based on the output from said threshold value means.

A eighth invention is featured by a noise reduction apparatus comprising:

noise reducing means for receiving a video signal and whose S/N improving amount is variable with respect to the inputted video signal;

S/N improving amount control signal producing means for receiving said video signal and for outputting a signal corresponding to at least one of a luminance signal level and an absolute value level of a chroma signal;

low level signal detecting means for receiving a luminance signal to thereby output such a luminance signal having a level lower than a preselected value;

a first counter for receiving the output from said low level signal detecting means and for counting the quantity of pixels whose level is judged as a low level within a preselected video section;

movement detecting means for detecting a movement within at least one field period;

high frequency range component detecting means for receiving said video signal to detect a high frequency range component of said video signal;

logic means for receiving the output from said low level signal detecting means, the output from said movement detecting means and the output from the said high frequency range component detecting means and for outputting a signal only when the input signal is a low level and contains the movement;

a second counter for receiving the output from said logic means so as to count the quantity of the output signals from said logic means within a preselected video section;

dividing means for receiving both the output from said first counter and the output from said second counter to thereby calculates a ratio of both the outputs from said first and second counters; and threshold value means for receiving the output from said dividing means and for comparing the output from said dividing means with a predetermined value to thereby output a large/small relationship; wherein:

said S/N improving amount control signal producing means outputs a control signal used to reduce the S/N improving amount of said noise reducing means when the luminance signal level and the absolute value level of the chroma signal are low; and the output from the S/N improving amount control signal producing means is controlled so as to increase the S/N improving amount based on the output from said threshold value means.

According to the above-described arrangement of the first invention, the S/N improving amount of the noise reducing means is controlled every pixel based upon at least one of the signal level of the luminance signal and the signal level of the chroma signal. For instance, with respect to the S/N improving amount of such a region that the luminance level is high and the absolute value level of the chroma signal is high (namely, for color saturation degree is high), the S/N improving amount of such a region that the luminance level is low and the color saturation degree is low is suppressed. As a result, the blur of the video signal is suppressed in the region where the signal cannot be easily discriminated from the noise and the signal owns the low level. The sufficient S/N improving effect can be achieved in the bright region.

According to the above-described arrangement of the second invention, the S/N improving amount of the noise reducing means is controlled every pixel based upon at least one of the signal level of the luminance signal and the signal level of the chroma signal. For instance, the S/N improving amount of such a region that the luminance level is low and the color saturation degree is low is suppressed. As a consequence, the blur of the high frequency range component signal for the region that the luminance level is low the color saturation degree is low can be suppressed. Also, the S/N ratio of the region for the low frequency range component can be apparently improved irrelevant to the signal level.

According to the above-described arrangement of the third invention, when the pixel number of the high frequency range component with the low signal level does not exceed the threshold value within a preselected picture section, there is a small blur of the high frequency range component. Accordingly, it is so arranged not to suppress the S/N improving amount of the noise reducing means in response to at least one of the luminance signal level and the absolute value level of the chroma signal. The overall screen of such a picture having the small pixel number of the high frequency range component with the low signal level can be S/N-improved.

According to the above-described arrangement of the fourth invention, when the rate of the high frequency range component with the low signal level does not exceed the threshold value, there is a small blur of the high frequency range component. Accordingly, it is so arranged not to suppress the S/N improving amount of the noise reducing means in response to at least one of the luminance signal level and the absolute value level of the chroma signal. The overall screen of such a picture having the small rate of the high frequency range component with the low signal level can be improved in S/N ratio.

According to the above-described arrangement of the fifth invention, when the pixel number of the movement components with the low signal level does not exceed the threshold value within a preselected picture section, there is less movement and a small blur caused by the movement. Accordingly, it is so arranged not to suppress the S/N improving amount of the noise reducing means in response to at least one of the luminance signal level and the absolute value level of the chroma signal. The overall screen of such a picture having the small pixel number of the movement components with the low signal level can be improved in S/N ratio.

According to the above-mentioned arrangement of the sixth invention, when the ratio of the movement component does not exceed the threshold value within the region whose signal level is low, there is small possibility that the blur occurs due to the movement. Accordingly, it is so arranged not to suppress the S/N improving amount of the noise reducing means in response to at least one of the luminance signal level and the absolute value level of the chroma signal. The S/N improvement can be achieved in the overall screen whose movement component ratio is low within the region with the low signal level.

According to the above-described arrangement of the seventh invention, when the pixel number of the movement of high frequency component with the low signal level does not exceed the threshold value within a preselected picture section, there is less fine movement and a small blur of the movement. Accordingly, it is so arranged not to suppress the S/N improving amount of the noise reducing means in response to at least one of the luminance signal level and the absolute value level of the chroma signal. The overall screen of such a picture having the small pixel number of the movement of the high frequency range component with the low signal level can be improved in S/N ratio.

According to the above-mentioned arrangement of the eighth invention, when the ratio of the movement in the high frequency range component does not exceed the threshold value within the region whose signal level is low, there is a small possibility that the blur occurs in the high frequency range component, because there is less fine movement. Accordingly, it is so arranged not to suppress the S/N improving amount of the noise reducing means in response to at least one of the luminance signal level and the absolute value level of the chroma signal. The S/N improvement can be achieved in the overall screen whose movement ratio for the high frequency range component is low within the region with the low signal level.

BRIEF DESCRIPTION OF THE DRAWINGS

FIG. 9 shows an output from the S/N improving amount control signal producing circuit 62 of FIG. 8;

FIG. 12 shows an output from the S/N improving amount control signal producing circuit 118 of FIG. 11;

DESCRIPTION OF THE PREFERRED EMBODIMENTS

A description will now be made of a first embodiment according to a first invention.

Figure 1:
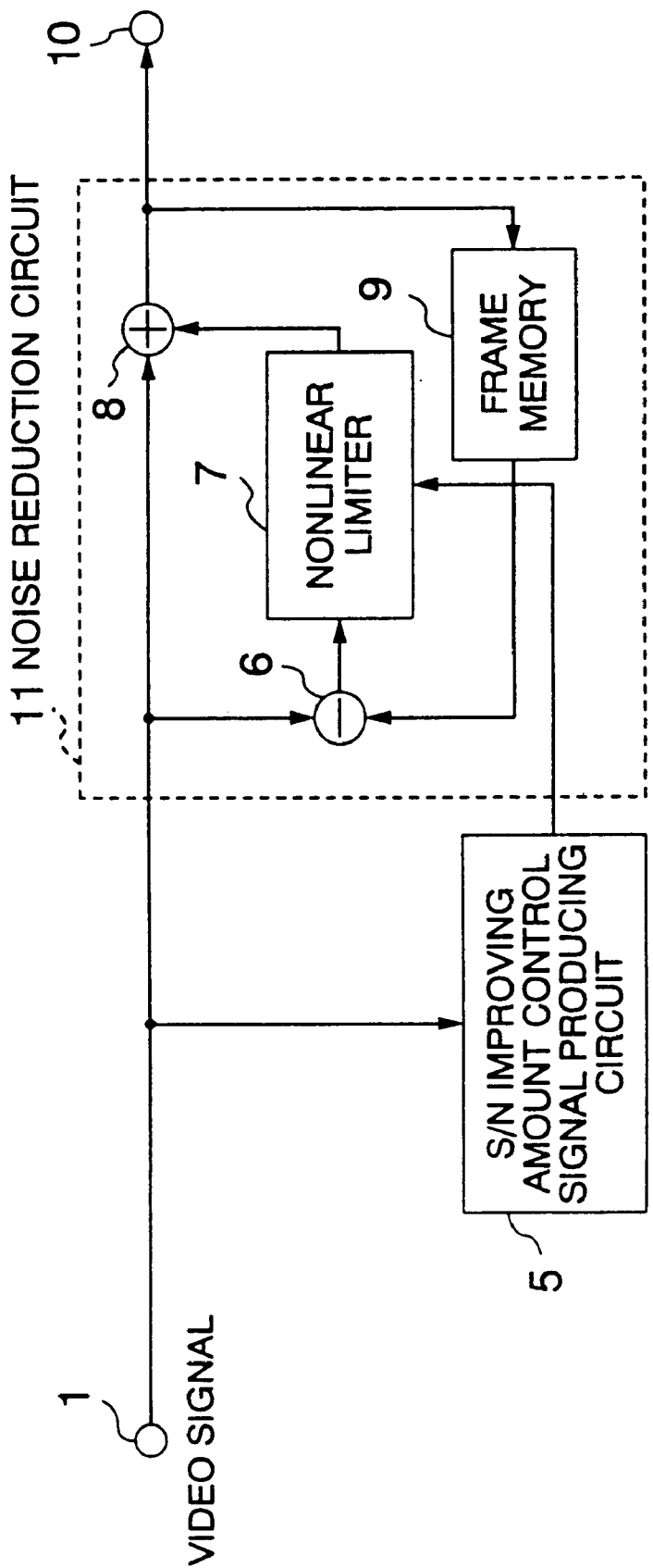
FIG. 1 is a schematic block diagram for showing a noise reduction apparatus according to a first embodiment of a first invention.
Figure 2:
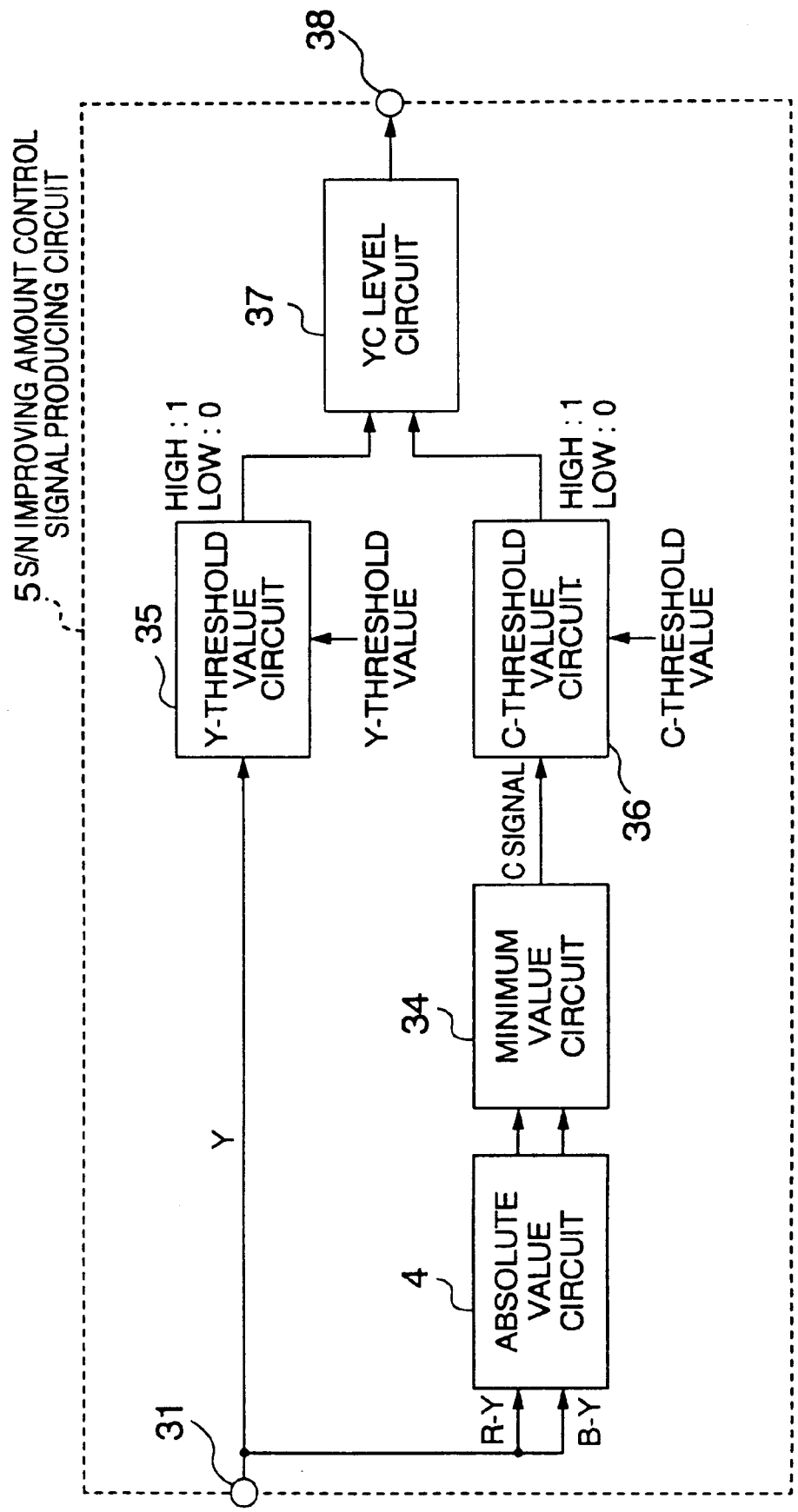
FIG. 2 schematically indicates an arrangement of an S/N improving amount control signal producing circuit 5 of FIG. 1.

FIG. 1 is a schematic block diagram for representing a noise reduction apparatus according to the first embodiment, in which the first invention is applied to a frame IIR (Infinite Impulse Response) type noise reducer. In FIG. 1, reference numeral 1 indicates an input terminal for inputting a video signal, reference numeral 5 is an S/N improving amount control signal producing circuit, reference numeral 6 shows a subtracter, reference numeral 7 denotes a nonlinear limiter and reference numeral 8 indicates an adder. Also, reference numeral 9 shows a frame memory for storing therein picture data of one frame, reference numeral 10 shows an output terminal for outputting a signal whose noise component has been reduced, and reference numeral 11 indicates a IIR type noise reducing circuit, the S/N improving amount of which is variable. An internal arrangement of the S/N improving amount control signal producing circuit 5 is shown in FIG. 2. In FIG. 2, reference numeral 31 shows an input terminal, reference numeral 4 is an absolute value circuit for calculating absolute values of the chroma signals (R-Y signal, B-Y signal) amount or magnitude of the input signal, reference numeral 34 shows a minimum value circuit for outputting a smaller absolute value of two sorts of chroma signals inputted therein as a C signal, and reference numeral 35 is a Y signal threshold value circuit for entering therein a luminance signal (Y signal) among the input signals and for outputting a 1 (one) when the luminance signal is larger than a preset threshold value and outputting a 0 (zero) when the luminance signal is smaller than this preset threshold value. Also, reference numeral 36 shows a C signal threshold value circuit for outputting a 1 (one) when the entered C signal is greater than a preset threshold value and for outputting a 0 (zero) when the entered C signal is smaller than this preset threshold value, reference numeral 37 shows an YC level control circuit to which is both the output of the Y signal threshold value circuit 35 and the output of the C signal threshold value circuit 36, and which produces a signal used to control the nonlinear limiter 7, and reference numeral 38 is an output terminal of the S/N improving amount control signal producing circuit 5. In the noise reduction apparatus with the above-described arrangement according to this first embodiment, operations thereof will now b described.

Figures 3, 4:
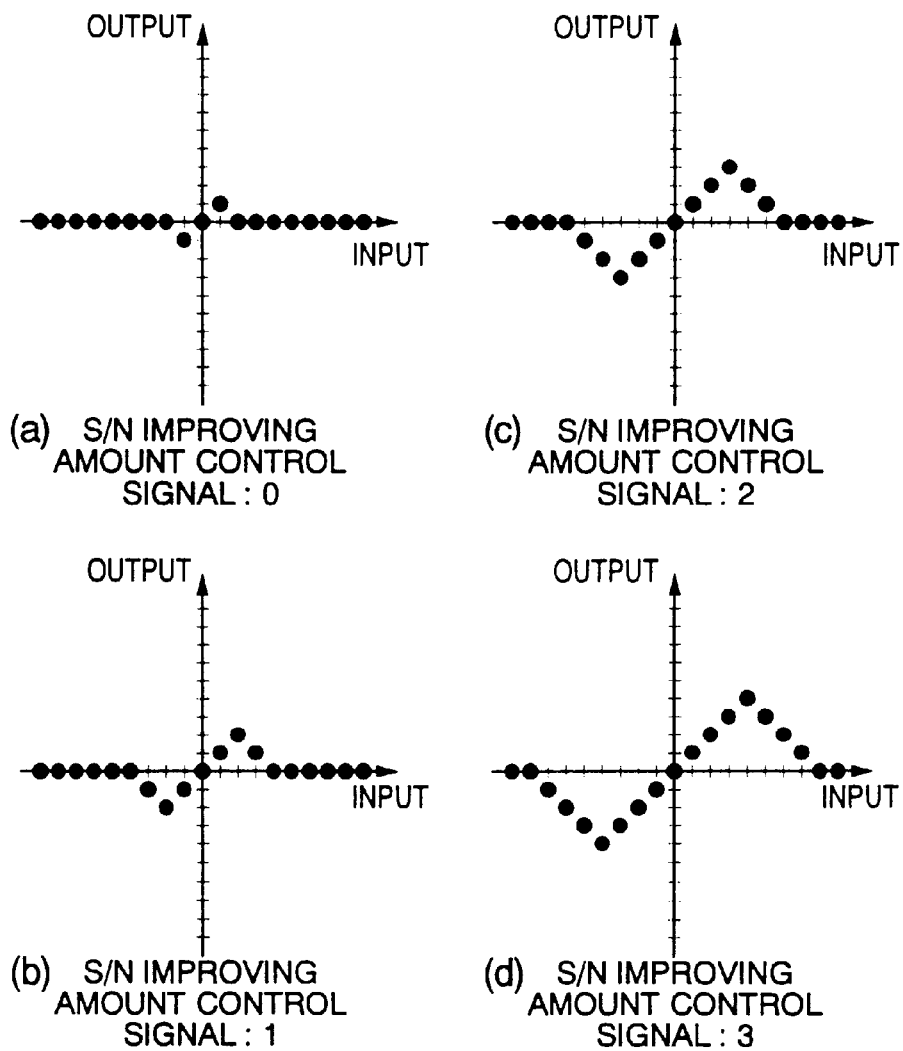
FIG. 3 represents a relationship between input/output signals of an YC level circuit employed in all of the embodiments of the invention.
FIG. 4 shows an input/output characteristic of a nonlinear limiter employed in all of the embodiments of the invention.

A first explanation is made of operations of the noise reducing circuit 11. A difference between the video signal inputted to the input terminal 1 and a video signal output from the frame memory 9, which precedes the first-mentioned video signal by one frame, is calculated by the subtracter 6. An inter frame difference signal (i.e., a difference between a certain frame signal and a subsequent frame signal) outputted from the subtracter 6 is multiplied in the nonlinear limiter 7 by a properly selected gain lower than or equal to 1 (one), and the multiplied signal is added to the original input signal by the adder 8, so that a level difference between the signals by one frame may be reduced. The output signal from the adder 8 is an output signal from the noise reducing circuit, and at the same time is input to the frame memory 9, and then the above-described process is repeatedly performed to the subsequent frame. When the input signal corresponds to a complete still picture (image), since the output from the subtracter 6 corresponds to such noise having no temporal correlation, the video signal whose noise components have been reduced can be obtained from the output terminal 10. To the contrary, when the input signal corresponds to a moving picture, since the output of the subtracter 6 contains the moving signal components other than the noise components, a leaving picture trail will occur. Therefore, the characteristic of the nonlinear limiter 7 is designed to be that of FIG. 4, so that the leaving picture trail is reduced. That is, when the inter frame difference signal is small, the output signal is regarded as the noise so that the noise reducing process is carried out. When the inter frame difference signal is large, output signal is regarded as the movement, so that no noise reducing process is carried out in order to prevent a leaving picture trail occurred in the moving portion. Furthermore, in the nonlinear limiter 7, the S/N improving amount may be changed in response to the control signal outputted from the S/N improving amount control signal producing circuit 5. As shown in FIG. 4, as long as the value of the S/N improving amount control signal is decreased, the output range of the nonlinear limiter 7 becomes narrower. Accordingly, the S/N improving amount becomes small and the leaving picture trail would be reduced.

Referring now to the drawing, a description will be made of the operation of the S/N improving amount control signal producing circuit 5 for producing such a control signal used to control the nonlinear limiter 7 so as to vary the S/N improving amount. The Y (luminance) signal among the video (picture) signal entered to an input terminal 31 of the S/N improving amount control signal producing circuit 5 is inputted to a Y-threshold value circuit 35. Both the R-Y signal and the B-Y signal among the video signal are first processed in an absolute value circuit 4 to thereby calculate absolute values thereof, and thereafter are processed in a minimum value circuit 34 to thereby calculate a minimum value between them, which will be supplied to a C-threshold value circuit 36. Each of the Y-threshold value circuit 35 and the C-threshold value circuit 36 outputs a 1 (one) when the relevant input signal is larger than a preset threshold value, and outputs a 0 (zero) when the relevant input signal is smaller than this preset threshold value. The binary-processed signals by the Y-threshold value circuit 35 and the C-threshold value circuit 36 are input to the YC level circuit 37. The YC level circuit 37 outputs a signal for controlling the nonlinear limiter 7 based on a characteristic shown in FIG. 3.

As previously explained, in accordance with this embodiment, based upon the characteristic of the S/N improving amount control signal processing circuit 5, the S/N improving amount of such a region where the level of the luminance signal is low and the saturation of the color signal is low is made smaller than that of such a region where the level of the luminance signal is high and the saturation of the color signal is high. Accordingly, in the region where the level is low and the signal cannot be easily discriminated from the noise, the S/N improving amount is reduced, so that the leaving picture trail caused by the noise reducer is suppressed, whereas in the region where the luminance signal level is high and the color saturation is high, the S/N improving effects can be properly achieved. In other words, while suppressing the blur of the low-leveled luminance signal, the S/N improving effects in the bright region can be achieved.

Now, a second embodiment of the first invention will be described.

Figure 5:
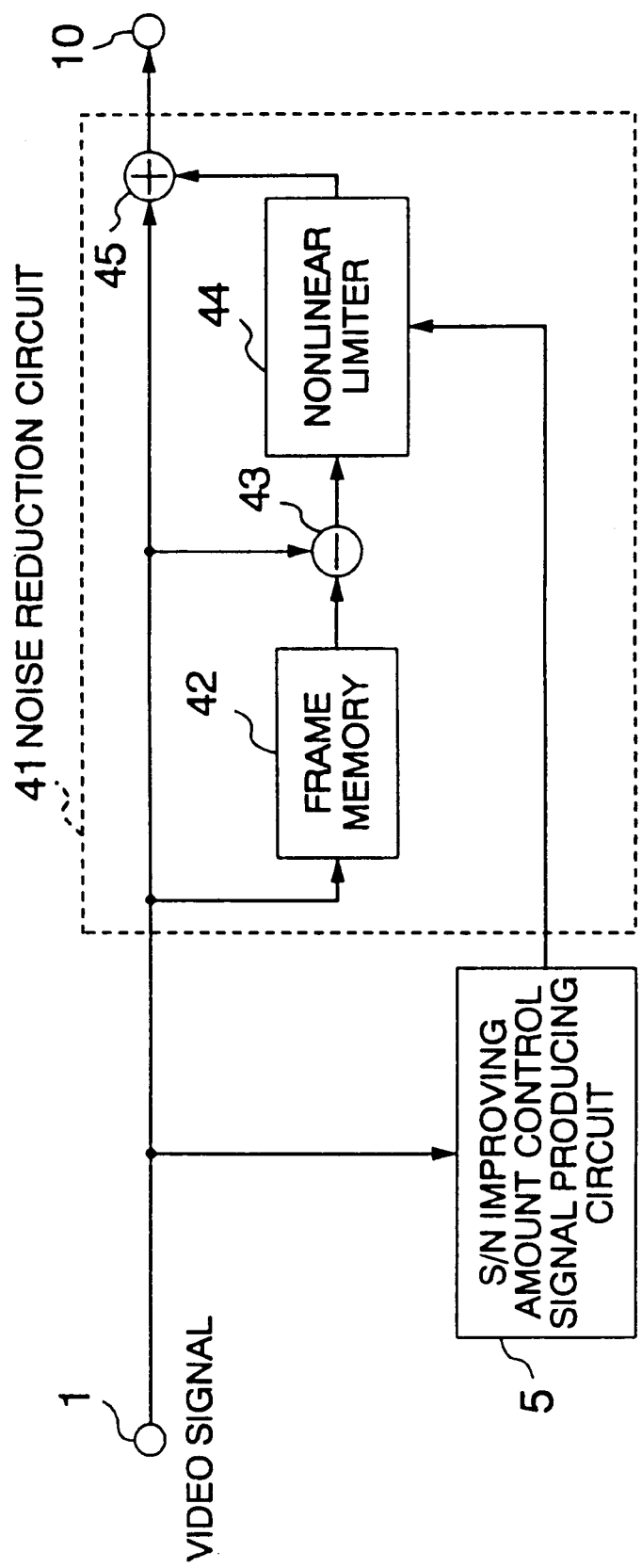
FIG. 5 is a schematic block diagram showing a noise reduction apparatus according to a second embodiment of the first invention.

FIG. 5 is a schematic block diagram showing a noise reduction apparatus according to the second embodiment, in which the first invention is applied to a frame FIR (Finite Impulse Response) type noise reducer. In FIG. 5, reference numeral 1 indicates an input terminal used to input a video signal, reference numeral 5 denotes an S/N improving amount control signal producing circuit for outputting a nonlinear signal with respect to the input signal, reference numeral 43 is a subtracter, reference numeral 44 shows a nonlinear limiter, and reference numeral 45 represents an adder. Also, reference numeral 42 is a frame memory for storing one frame picture, reference numeral 10 is an output terminal for outputting a signal whose noise component has been reduced, and reference numeral 41 indicates a FIR type noise reducing circuit whose S/N improving amount is variable. An internal arrangement of the S/N improving amount control signal producing circuit 5 of FIG. 5 is represented in FIG. 2. FIG. 2 is similar to that explained with reference to the first embodiment.

The operation of the noise reducing circuit 41 will now be explained. A difference between the video signal entered into the input terminal 1 and the video signal delayed by one frame by the frame memory 42 is calculated by the subtracter 43. An inter frame difference signal (i.e., a difference between a certain frame signal and a subsequent frame signal) outputted from the subtracter 43 is multiplied in the nonlinear limiter 44 by a properly selected gain lower than or equal to 1 (one), and the multiplied signal is added to the original input signal by the adder 45, so that a level difference between the signals by one frame may be reduced. The output from the adder 45 is the output from the noise reducing circuit. When the input signal corresponds to a complete still picture (image), since the output from the subtracter 43 corresponds to such noise having no temporal correlation, the video signal whose noise components have been reduced can be obtained at the output terminal 10. To the contrary, when the input signal corresponds to a moving picture, since the output of the subtracter 43 contains the moving signal components other than the noise components, a leaving picture trail will occur. Therefore, the characteristic of the nonlinear limiter 44 is designed to be that of FIG. 4, so that the leaving picture trail is reduced. That is, when the inter frame difference signal is small, the output signal is regarded as noise so that the noise reducing process is carried out. When the inter frame difference signal is large, the output signal is regarded as movement, so that no noise reducing process is carried out in order to prevent a leaving picture trail occurred in the moving portion. Furthermore, in the nonlinear limiter 44, the S/N improving amount may be changed in response to the control signal output from the S/N improving amount control signal producing circuit 5. As shown in FIG. 4, as long as the value of the S/N improving amount control signal is decreased, the output range of the nonlinear limiter 44 becomes narrow. Accordingly, the S/N improving amount becomes small and the leaving picture trail would be reduced.

Operations of the S/N improving amount control signal producing circuit 5 are similar to those of the first embodiment. Also, in this embodiment, based upon the characteristic of the S/N improving amount control signal processing circuit 5, the S/N improving amount of such a region where the level of the luminance signal is low and the saturation of the color signal is low is made smaller than that of such a region where the level of the luminance signal is high and the saturation of the color signal is high. Accordingly, in the region where the level is low and the signal cannot be easily discriminated from the noise, the S/N improving amount is reduced, so that the leaving picture trail caused by the noise reducer is suppressed, whereas in the region where the luminance signal level is high and the color saturation is high, the S/N improving effects can be properly achieved. In other words, while suppressing the blur of the low-leveled luminance signal, the S/N improving effects in the bright region can be achieved.

Now, a description will be made of a third embodiment such that the first invention is applied to a coring circuit without employing a frame memory.

Figure 6:
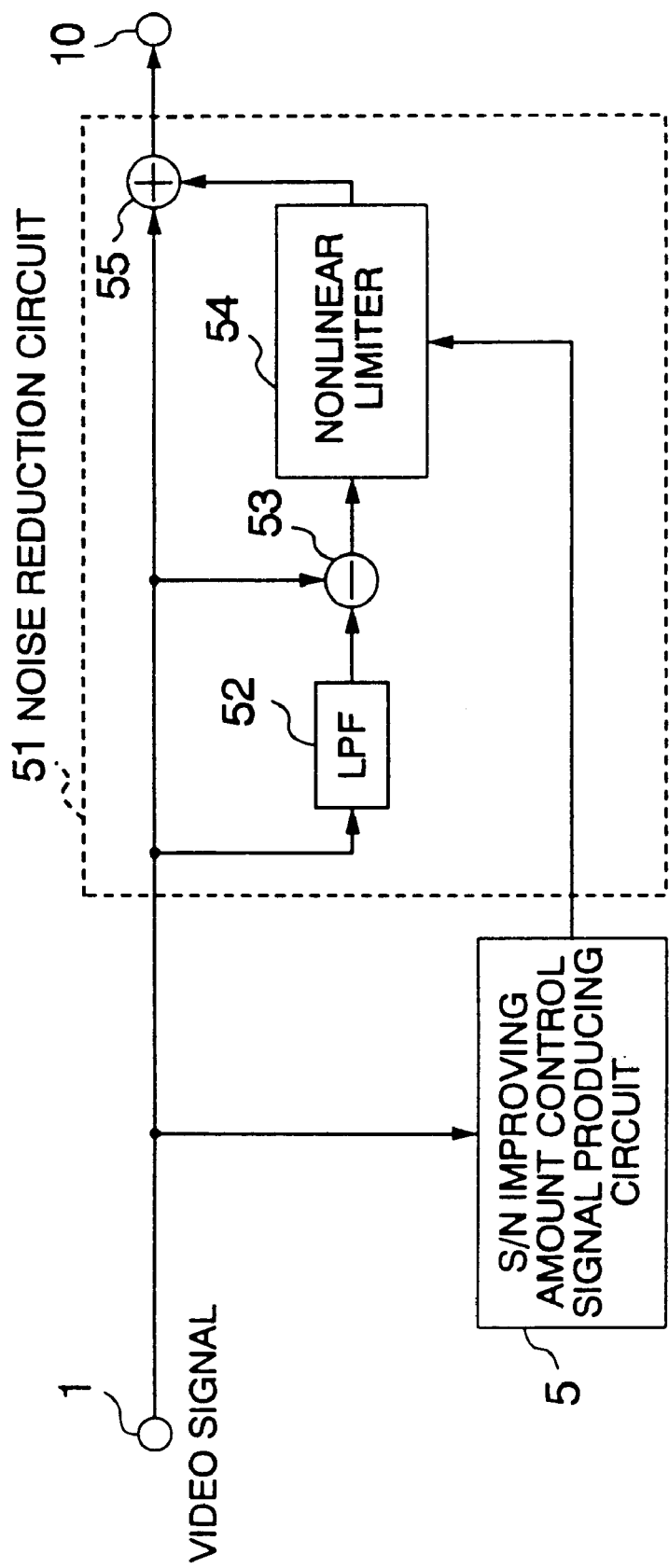
FIG. 6 is a schematic block diagram for showing a noise reduction apparatus according to a third embodiment of the first invention.

FIG. 6 is a schematic block diagram showing a noise reduction apparatus according to the third embodiment of the first invention. In FIG. 6, reference numeral 1 indicates an input terminal used to input a video signal, reference numeral 5 denotes an S/N improving amount control signal producing circuit for outputting a nonlinear signal with respect to the input signal, reference numeral 53 is a subtracter, reference numeral 54 shows a nonlinear limiter, and reference numeral 55 represents an adder. Also, reference numeral 52 is a low-pass filter for passing therethrough a low frequency component of the input signal, reference numeral 10 is an output terminal for outputting a signal whose noise component has been reduced, and reference numeral 51 indicates a noise reducing circuit with employment of a coring circuit whose S/N improving circuit is variable. An internal arrangement of the S/N improving amount control signal producing circuit 5 in FIG. 6 is represented in FIG. 2. The operation of FIG. 2 is similar to that explained above with reference to the first embodiment.

An explanation now is made of the operations of the noise reducing circuit 51. A difference between the video signal inputted into the input terminal 1 and an output signal from the low-pass filter 52 is calculated by the subtracter 53. This signal corresponds to a high frequency range component of the input video signal. The signal having the high frequency range component of the input video signal outputted from the subtracter 53 is multiplied by a proper gain lower than or equal to 1 (one), and the multiplied signal is added to the original input signal by the adder 55, so that a signal whose high frequency component has been suppressed may be reduced. The output from the adder 55 is the output from the noise reducing circuit. In accordance with the noise reducing circuit with the above-described arrangement, the apparently visible noise of the high frequency range component may be reduced, but at the same time, the high frequency range component of the signal component would be reduced. As a result, a blur of the picture will occur in the high frequency range component of the signal. Therefore, the characteristic of the nonlinear limiter 54 is designed to be that shown in FIG. 4, so that the blur in the high frequency range component could be reduced. That is, when the high frequency range component is small, the output signal is regarded as noise so that the noise reducing process is carried out. When the high frequency range component is large, the output signal is regarded as the movement, so that no noise reducing process is carried out in order to prevent such a blur of the high frequency range component. Furthermore, in the nonlinear limiter 54, the S/N improving amount may be changed in response to the control signal output from the S/N improving amount control signal producing circuit 5. As shown in FIG. 4, as long as the value of the S/N improving amount control signal is decreased, the output range of the nonlinear limiter 54 becomes narrow. Accordingly, the S/N improving amount becomes small and the blur of the high frequency range component would be reduced.

The Operations of the S/N improving amount control signal producing circuit 5 are similar to these of the first embodiment. Also in the present embodiment, based upon the characteristic of the S/N improving amount control signal processing circuit 5, the S/N improving amount of such a region where the level of the luminance signal is low and the saturation of the color signal is low is made smaller than that of such a region where the level of the luminance signal is high and the saturation of the color signal is high. Accordingly, in the region where the level is low and the signal cannot be easily discriminated from the noise, the S/N improving amount is reduced, so that the high-frequency component blur caused by the noise reducer is suppressed, whereas in the region where the luminance signal level is high and the color saturation is high, the S/N improving effects can be properly achieved. In other words, while suppressing the blur of the low-leveled luminance signal, the S/N improving effects in the bright region can be achieved.

The following is a description of an embodiment of the second invention.

Figure 7:
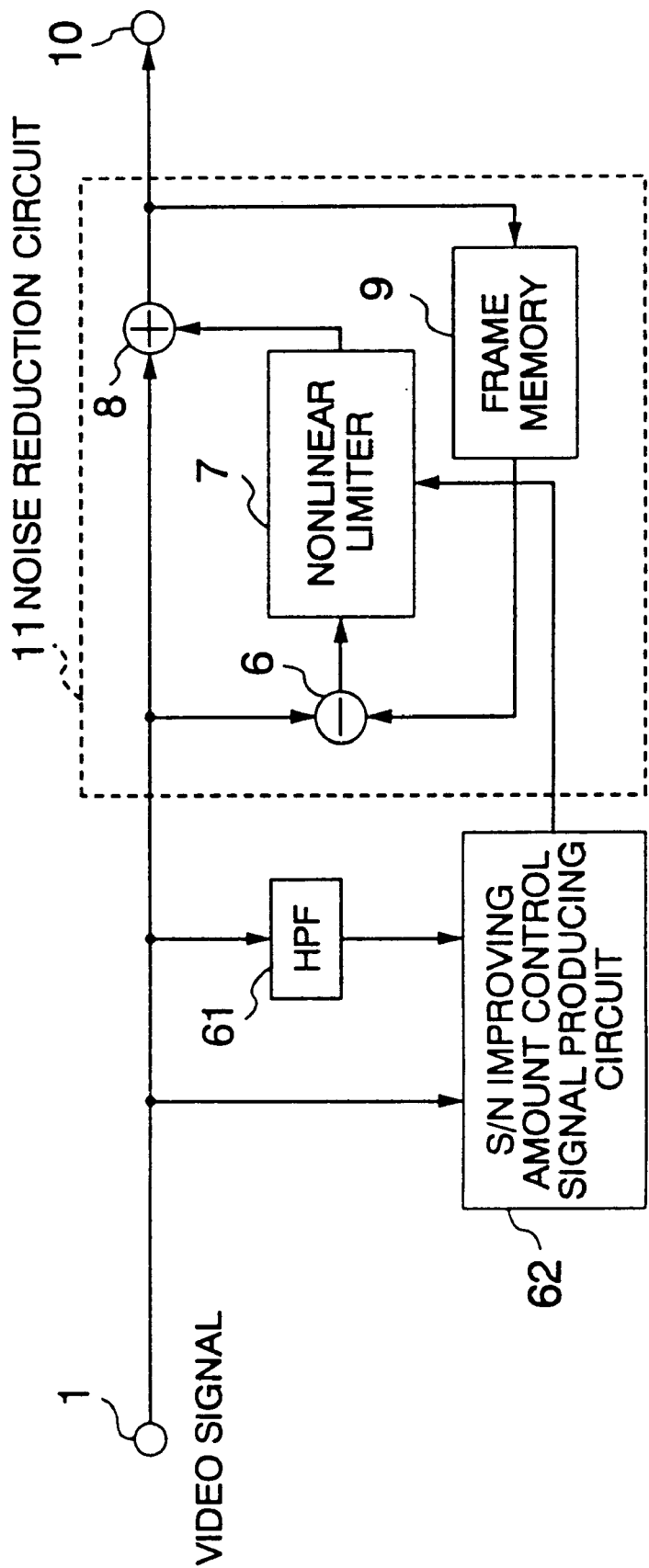
FIG. 7 is a schematic block diagram for showing a noise reduction apparatus according to a first embodiment of a second invention.
Figure 8:
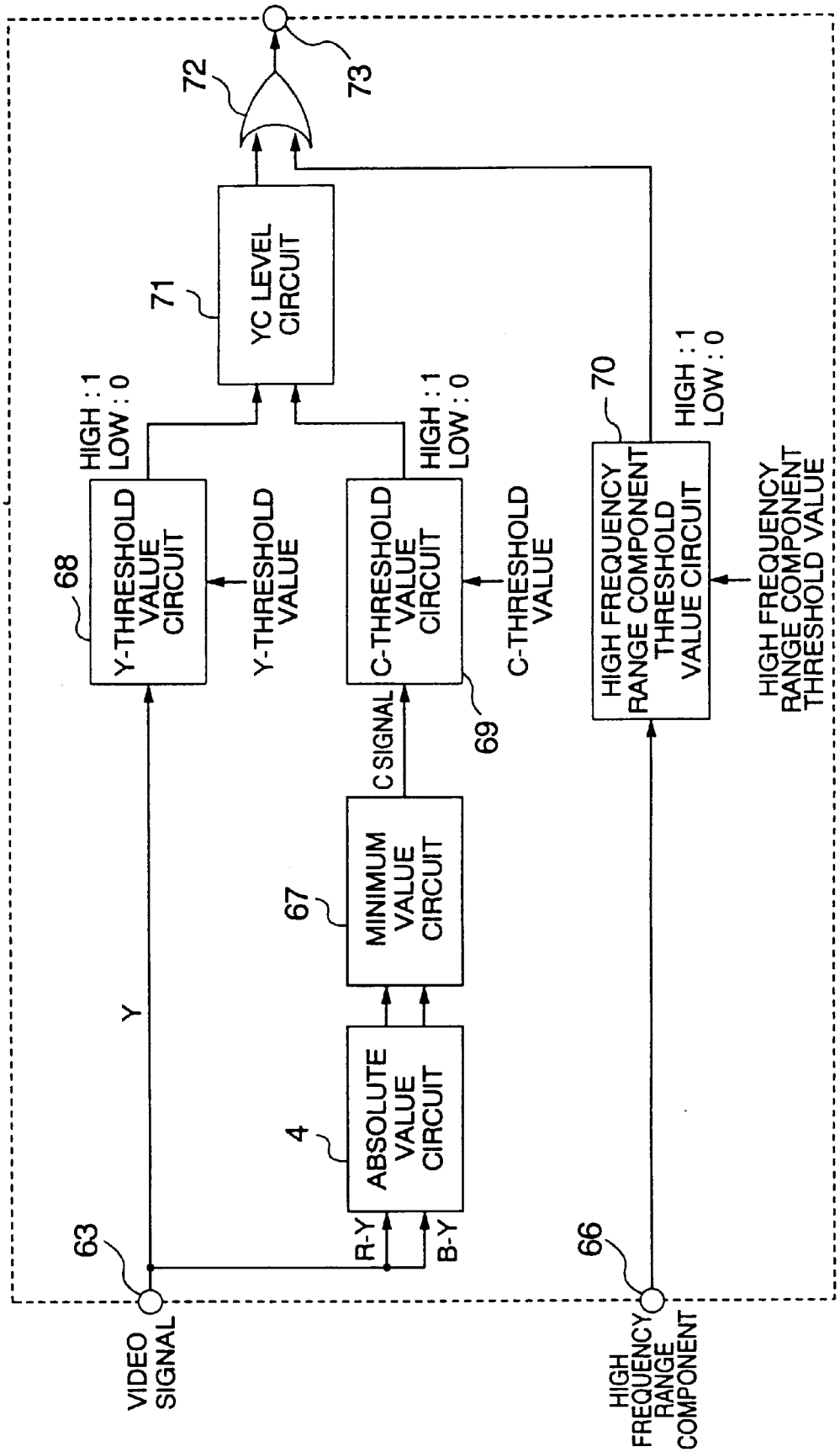
FIG. 8 schematically represents an arrangement of an S/N improving amount control signal producing circuit 62 of FIG. 7.

FIG. 7 is a schematic block diagram showing a noise reduction apparatus according to an embodiment of the second invention. In FIG. 7, reference numeral 1 is an input terminal for inputting a video signal, reference numeral 61 indicates a high-pass filter for outputting a high frequency range component of an input signal, reference numeral 62 denotes an S/N improving amount control signal producing circuit for outputting a nonlinear signal with respect to the input signal, reference numeral 6 is a subtracter, reference numeral 7 shows a nonlinear limiter, and reference numeral 8 represents an adder. Also, reference numeral 9 is a frame memory for storing a one frame picture, reference numeral 10 is an output terminal for outputting a signal whose noise component has been reduced, and reference numeral 11 indicates a FIR type noise reducing circuit whose S/N improving amount is variable. An internal arrangement of the S/N improving mount control signal producing circuit 62 in FIG. 7 is represented in FIG. 8. In FIG. 8, reference numeral 63 is an input terminal of a video signal, reference numeral 66 shows another input terminal for inputting therein the output signal of the high-pass filter 61, reference numeral 4 is an absolute value circuit for calculating absolute values of chroma signals (R-Y signal, B-Y signal) among the input signal, reference numeral 67 shows a minimum value circuit for outputting a smaller absolute value of two sorts of chroma signals inputted therein as a C signal, and reference numeral 68 is a Y signal threshold value circuit for receiving a luminance signal (Y signal) among the input signals and for outputting a 1 (one) when the luminance signal is larger than a preset threshold value and outputting a 0 (zero) when the luminance signal is smaller than this preset threshold value. Also, reference numeral 69 shows a C signal threshold value circuit for outputting a 1 (one) when the entered C signal is greater than a preset threshold value and for outputting a 0 (zero) when the entered C signal is smaller than this preset threshold value, and reference numeral 70 is a high-frequency range component threshold value circuit for outputting a 0 (zero) when the absolute value of the inputted high frequency range component is larger than a preset threshold value, and outputting a 1 (one) when the absolute value of the inputted high frequency range component is smaller than this preset threshold value. Further, reference numeral 71 shows an YC level control circuit for receiving both the output of the Y signal threshold value circuit 68 and the output of the C signal threshold value circuit 69, and for producing a signal used to control the nonlinear limiter 7, reference numeral 72 is an OR gate circuit for OR-gating the output from the YC level control circuit 71 and the output from the high-frequency range component threshold value circuit 70, and reference numeral 73 is an output terminal of the S/N improving amount control signal producing circuit 62. The characteristic of the nonlinear limiter 7 in FIG. 7 is represented of FIG. 4. The operation of the noise reduction apparatus with the above-described arrangement according to this first embodiment, will now be described. It should be noted that the same reference numerals shown in the previously explained embodiments will be employed as those for denoting the same or similar circuit elements of the following embodiments.

The noise reducing circuit 11 corresponds to the IIR type noise reducer with employment of the inter frame difference signal, as previously explained in the first embodiment of the first invention. When the inter frame difference signal is small, the output signal is regarded as noise so that the noise reducing process is carried out. When the inter frame difference signal is large, the output signal is regarded as the movement, so that no noise reducing process is carried out in order to prevent a leaving picture trail occurred in the moving portion. Also, in the nonlinear limiter 7, the S/N improving amount may be changed in response to the control signal output from the S/N improving amount control signal producing circuit 62. As shown in FIG. 4, as long as the value of the S/N improving amount control signal is decreased, the output range of the nonlinear limiter 7 becomes narrower. Accordingly, the S/N improving amount becomes small and the leaving picture trail would be reduced.

Referring now to the drawing, a description will be made of the operation of the S/N improving amount control signal producing circuit 62 for producing such a control signal used to control the nonlinear limiter 7 so as to vary the S/N improving amount. The Y (luminance) signal among the video (picture) signal fed to an input terminal 63 of the S/N improving amount control signal producing circuit 62 is input to a Y-threshold value circuit 68. Both the R-Y signal and the B-Y signal among the video signal are first processed in an absolute value circuit 4 to thereby calculate absolute values thereof, and thereafter are processed in a minimum value circuit 67 to thereby calculates a minimum value between them, which will be supplied to a C-threshold value circuit 69. Each of the Y-threshold value circuit 68 and the C-threshold value circuit 69 output a 1 when the relevant input signal is larger than a preset threshold value, and outputs a 0 (zero) when the relevant input signal is smaller than this preset threshold value. Also, the high frequency range component obtained from the high-pass filter 61 is fed to the input terminal 66 to be thereby converted into a binary-processed signal based upon a preset threshold value by the high-frequency range component threshold value circuit 70. In this embodiment, when the input signal corresponds to the high frequency range component, the high-frequency range component threshold value circuit 70 outputs a 0 (zero), whereas when the input signal corresponds to the low frequency range component, the high-frequency range component threshold value circuit 70 outputs a 1 (one). The binary-processed signals of the Y-threshold value circuit 68 and the C-threshold value circuit 69 are inputted into a YC level circuit 71. The YC level circuit 71 outputs a signal for controlling the nonlinear limiter 7 based on a characteristic shown in FIG. 3. The output from the YC level circuit 71 and the output from the high-frequency range component threshold value circuit 70 are fed to the OR gate circuit 72, so that an output signal represented in FIG. 9 is outputted from the S/N improving amount control signal producing circuit 62 as an output signal.

As previously explained, in accordance with this embodiment, based upon the characteristic of the S/N improving amount control signal processing circuit 62, the S/N improving amount of such a region where the level of the luminance signal is low and the saturation of the color signal is low is made smaller than that of such a region where the level of the luminance signal is high and the saturation of the color signal is high. Accordingly, in the region where the level is low and the signal cannot be easily discriminated from the noise, the S/N improving amount is reduced, so that the leaving picture trail caused by the noise reducer is suppressed, whereas in the region where the luminance signal level is high and the color saturation is high, the S/N improving effects can be properly achieved. In other words, while suppressing the blur of the low-leveled luminance signal, the S/N improving effects in the bright region can be achieved.

Now, an embodiment of a third invention will be described.

Figure 10:
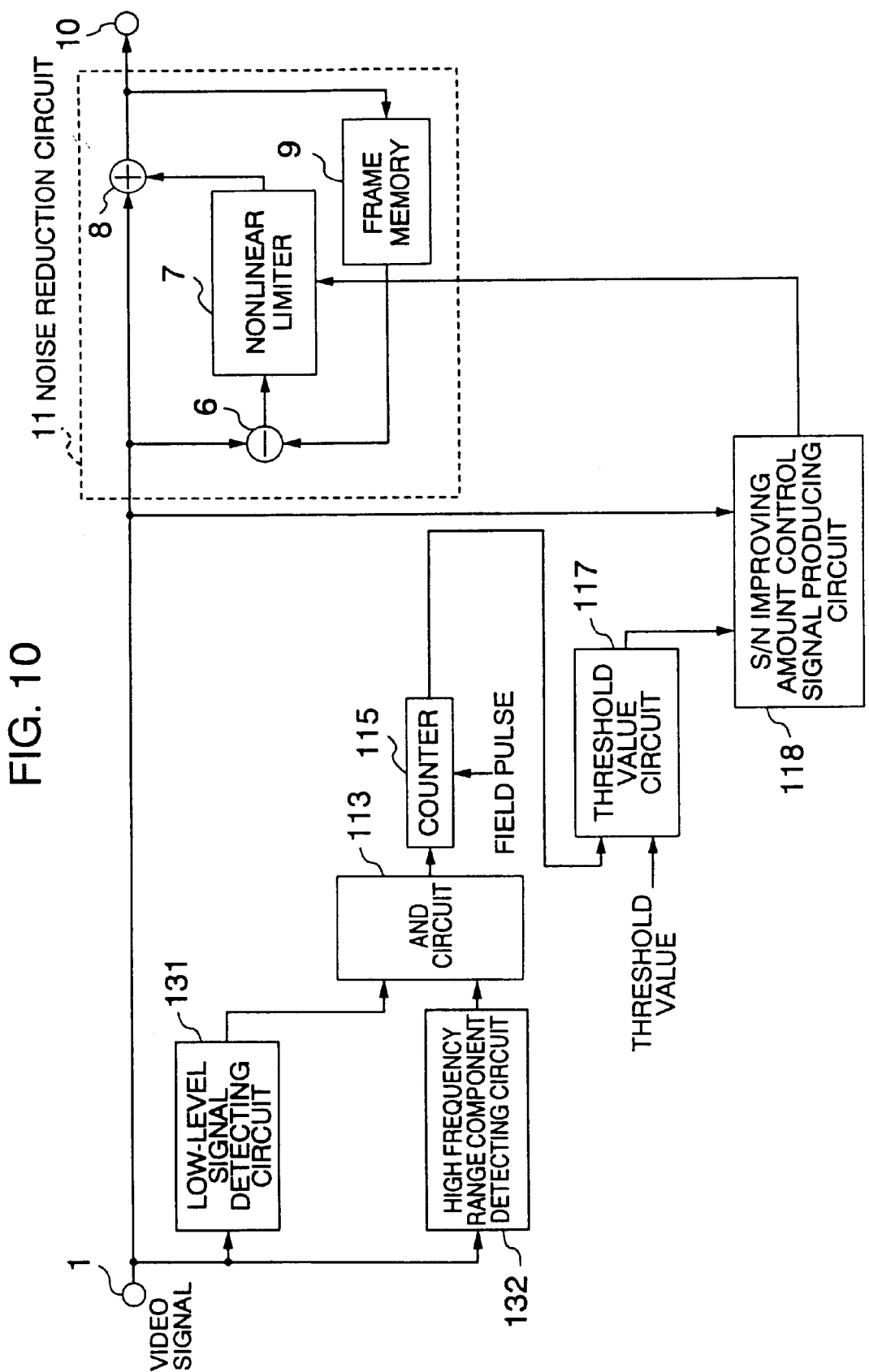
FIG. 10 is a schematic block diagram indicating a noise reduction apparatus according to a first embodiment of a third invention.
Figure 11:
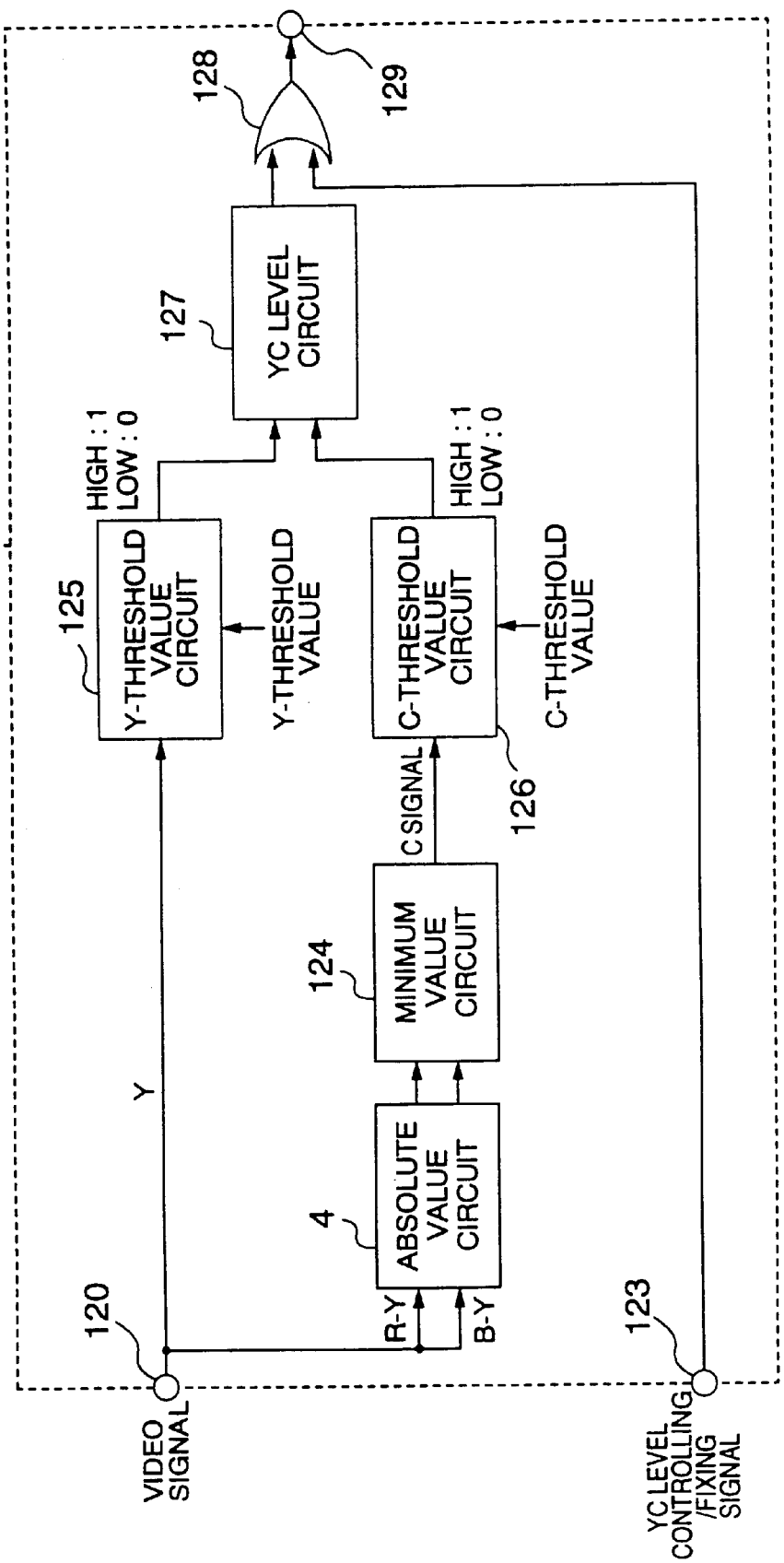
FIG. 11 schematically represents an arrangement of an S/N improving amount control signal producing circuit 118 of FIG. 10.

FIG. 10 is a schematic block diagram showing a noise reduction apparatus according to the embodiment of the third invention. In FIG. 10, reference numeral 1 indicates an input terminal used to input a video signal, reference numeral 118 denotes an S/N improving amount control signal producing circuit for outputting a nonlinear signal with respect to the input signal, reference numeral 6 is a subtracter, reference numeral 7 shows a nonlinear limiter, and reference numeral 8 represents an adder. Also, reference numeral 9 is a frame memory for storing a one frame picture, reference numeral 10 is an output terminal for outputting a signal whose noise component has been reduced, and reference numeral 11 indicates a cyclic type noise reducing circuit whose S/N improving amount is variable. Reference numeral 131 shows a low level detecting circuit for outputting a signal only when a pixel of a Y signal among the entered video signal is smaller than a constant level, reference numeral 132 indicates a high-frequency range component detecting circuit for outputting a signal only when a detection is made of a high frequency range component of the Y signal among the entered video signal and an absolute value of the high frequency range component is higher than, or equal to a constant level, and reference numeral 113 is an AND gate circuit for AND-gating the output of the low level detecting circuit 131 and the output of the high-frequency range component detecting circuit 132 and for outputting a signal only which an input signal has a low level and a high frequency range component. Reference numeral 115 denotes a counter for counting the number of output signals from the AND gate circuit 113 per one field, and reference numeral 117 shows a threshold value circuit for outputting a (zero) as a YC level controlling/fixing signal when the count output of the counter 115 exceeds a threshold value, and for outputting a 1 (one) as the YC level controlling/fixing signal when the count output of the counter 115 does not exceed this threshold value. In FIG. 11, there is shown a schematic block diagram of an arrangement of the S/N improving amount control signal producing circuit 118 in FIG. 10. In FIG. 11, reference numeral 120 is an input terminal for the video signal, reference numeral 123 denotes another input terminal for inputting the YC level controlling/fixing signal corresponding to the output from the threshold value circuit 117, reference numeral 4 is an absolute value circuit for calculating absolute values of chroma signals (R-Y signal, B-Y signal) among the input signal, reference numeral 124 shows a minimum value circuit for outputting a smaller absolute value of two sorts of chroma signals inputted thereto as a C signal, and reference numeral 125 is a y signal threshold value circuit for receiving a luminance signal (Y signal) among the input signals and for outputting a 1 (one) when the luminance signal is larger than a preset threshold value and outputting a 0 (zero) when the luminance signal is smaller than this preset threshold value. Also, reference numeral 126 shows a C signal threshold value circuit for outputting a 1 (one) when the entered C signal is greater than a preset threshold value and for outputting a 0 (zero) when the entered C signal is smaller than this preset threshold value, reference numeral 127 shows an YC level control circuit for receiving both the output of the Y signal threshold value circuit 125 and the output of the C signal threshold value circuit 126, and for producing a signal used to control the nonlinear limiter 7, reference numeral 128 is an OR gate circuit for OR-gating the YC level controlling/fixing signal fed to the input terminal 123 and the output signal of the YC level circuit 127, and reference numeral 129 is an output terminal of the S/N improving amount control signal producing circuit 118. A characteristic of the nonlinear limiter 7 in FIG. 10 is represented in FIG. 4. In the noise reduction apparatus with the above-described arrangement according to this embodiment, operations thereof will now be described. The same reference numerals described in the previous embodiment are employed as those for indicating the similar circuit elements.

The noise reducing circuit 11 corresponds to the IIR type noise reducer with employment of the inter frame difference signal, as previously explained in the first embodiment of the first invention. When the inter frame difference signal is small, the output signal is regarded as noise so that the noise reducing process is carried out. When the inter frame difference signal is large, the output signal is regarded as movement, so that no noise reducing process is carried out in order to prevent a leaving picture trail occurred in the moving portion. Also, in the nonlinear limiter 7, the S/N improving amount may be changed in response to the control signal outputted from the S/N improving amount control signal producing circuit 118. As shown in FIG. 4, as long as the value of the S/N improving amount control signal is decreased, the output range of the nonlinear limiter 7 becomes narrower. Accordingly, the S/N improving amount becomes small and the leaving picture trail would be reduced.

Next, an explanation is made of a producing operation of the YC level controlling/fixing signal by which the output from the S/N improving amount control signal producing circuit is controlled. The counter 115 (FIG. 10) counts up the number of pixels of the signal having the low level per one field, among the signals detected by the high frequency component detecting circuit 132. The counter output is compared with a preset threshold value by the threshold value circuit 117 and a binary signal is output as the YC level controlling/fixing signal. In this embodiment, the threshold value circuit 117 outputs a 0 (zero) when the pixel number of the high frequency range component with the low level per one field is larger than the preset threshold value, and outputs 1 (one) when this pixel number is smaller than the preset threshold value.

Referring now to the drawing, a description will be made of operation of the S/N improving amount control signal producing circuit 118 for producing such a control signal used to control the nonlinear limiter 7 so as to vary the S/N improving amount. The signal among the video signal fed to an input terminal 120 of the S/N improving amount control signal producing circuit 118 is fed to a Y-threshold value circuit 125. Both the R-Y signal and the B-Y signal among the video signal are first processed in an absolute value circuit 4 to thereby calculate absolute value thereof, and thereafter are processed in a minimum value circuit 124 to thereby calculate a minimum difference value between them, which will be supplied to a C-threshold value circuit 126. Each of the Y-threshold value circuit 125 and the C-threshold value circuit 126 output 1 (one) when the relevant input signal is larger than a preset threshold value, and outputs a 0 (zero) when the relevant input signal is smaller than this preset threshold value. The binary-processed output signals of the Y-threshold value circuit 125 and of the C-threshold value circuit 126 are fed to a YC level circuit 127. The YC level circuit 127 outputs a signal based on a characteristic shown in FIG. 3. Both the YC level controlling/fixing signal fed to into the input terminal 123 and the output from the YC level circuit 127 are fed the OR gate circuit 128, so that an output signal represented in FIG. 12 is output from the S/N improving amount control signal producing circuit 118 as an output signal.

As previously explained, in accordance with this embodiment, based upon the characteristic of the S/N improving amount control signal processing circuit 118, the S/N improving amount of such a region where the level of the luminance signal is low and the saturation of the color signal is low is made smaller than that of such a region where the level of the luminance signal is high and the saturation of the color signal is high. Accordingly, in the region where the level is low and the signal cannot be easily discriminated from the noise, the S/N improving amount is reduced, so that the leaving picture trail caused by the noise reducer is suppressed, whereas in the region where the luminance signal level is high and the color saturation is high, the S/N improving effects can be properly achieved. In addition, in the case that there is a small pixel number of the high frequency range component with the low level in one field, since the leaving picture trail caused by the noise reduction can hardly occur, the proper control by the signal level is interrupted, whereby the S/N ratio of the entire screen can be improved.

Now, an embodiment of a fourth invention will be described.

Figure 13:
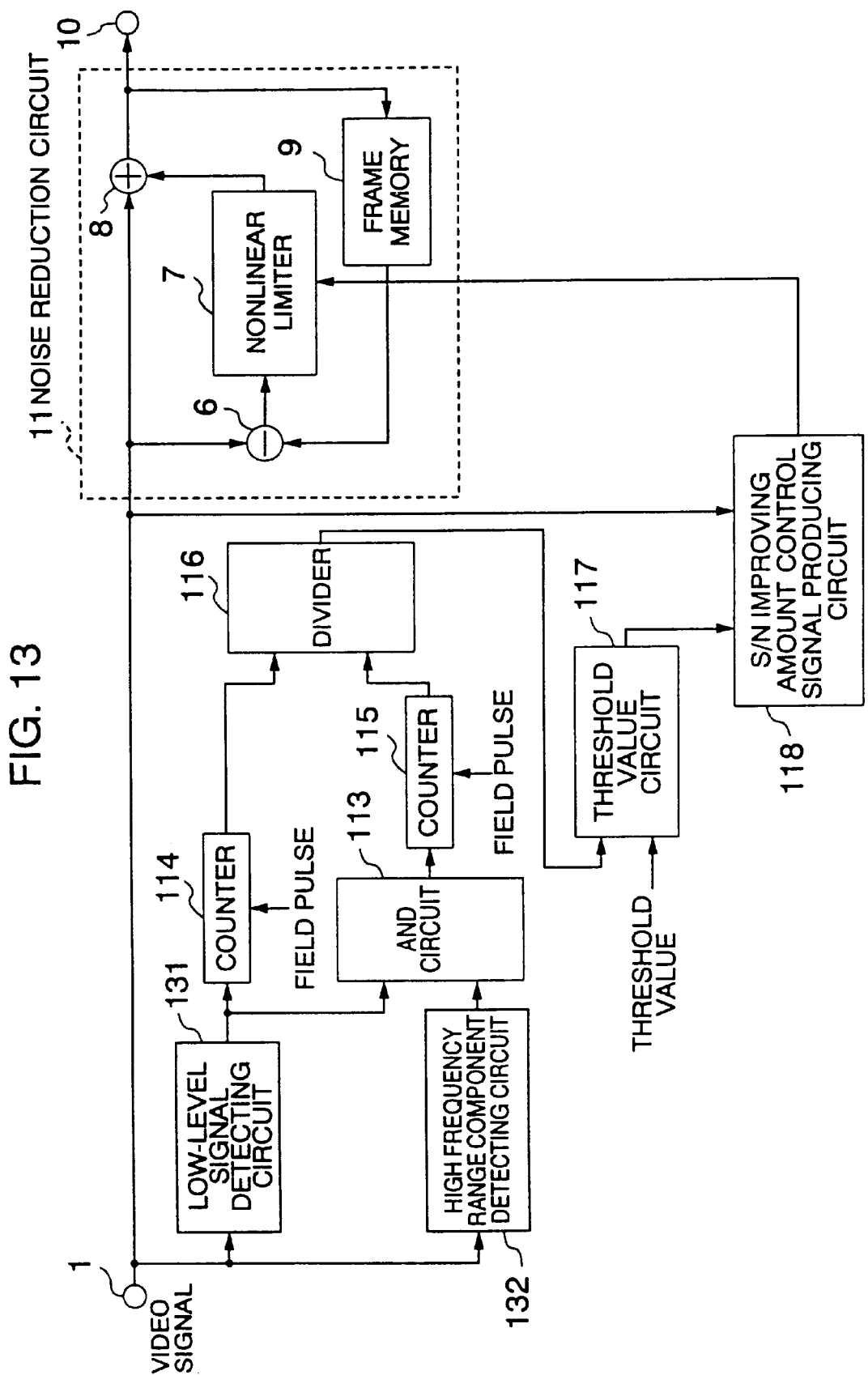
FIG. 13 is a schematic block diagram indicating a noise reduction apparatus according to a first embodiment of a fourth invention.

FIG. 13 is a schematic block diagram showing a noise reduction apparatus according to the embodiment of the fourth invention. In FIG. 13, reference numeral 1 indicates an input terminal used to input a video signal, reference numeral 118 denotes an S/N improving amount control signal producing circuit for outputting a nonlinear signal with respect to the input signal, reference numeral 6 is a subtracter, reference numeral 7 shows a nonlinear limiter, and reference numeral 8 is an adder. Also, reference numeral 9 is a frame memory for storing one frame picture, reference numeral 10 is an output terminal for outputting a signal whose noise component has been reduced, and reference numeral 11 indicates a cyclic type noise reducing circuit whose S/N improving amount is variable. Reference numeral 131 shows a low level detecting circuit for outputting a signal only when a pixel of a Y signal among the entered video signal is smaller than a constant level, reference numeral 132 indicates a high-frequency range component detecting circuit for outputting a signal only when a detection is made of a high frequency range component of the Y signal among the entered video signal and an absolute value of the high frequency range component is higher than, or equal to a constant level, and reference numeral 113 is an AND gate circuit for AND-gating the output of the low level detecting circuit 131 and the output of the high-frequency range component detecting circuit 132 and for outputting a signal only which an input signal has a low level and a high frequency range component. Reference numeral 114 denotes a first counter for counting the number of output signal derived from the low level signal detecting circuit 131 per one field, numeral 115 is a second counter for counting the number of output signal derived from the AND gate circuit 113 per one field, reference numeral 116 is a divider for dividing the output of the second counter 115 by the output of the first counter 114, and reference numeral 117 shows a threshold value circuit for outputting a 0 as a YC level controlling/fixing signal when the output of the divider 116 exceeds a threshold value, and for outputting a 1 (one) as a YC level controlling/fixing signal when the output of the divider 116 does not exceed this threshold value. In a schematic block diagram of an arrangement of the S/N improving amount control signal producing circuit 118 of FIG. 3 is shown in FIG. 11. Since the arrangement of FIG. 11 was previously explained, an explanation thereof is omitted here. A characteristic of the nonlinear limiter 7 in FIG. 13 is represented in FIG. 4. In the noise reduction apparatus with the above-described arrangement according to this embodiment, operations thereof will now be described. The same reference numerals described in the previous embodiment are employed as those for indicating the similar circuit elements.

The noise reducing circuit 11 corresponds to the IIR type noise reducer with employment of the inter frame difference signal, as previously explained in the first embodiment of the first invention. When the inter frame difference signal is small, the output signal is regarded as noise so that the noise reducing process is carried out. When the inter frame difference signal is large, the output signal is regarded as movement, so that no noise reducing process is carried out in order to prevent a leaving picture trail occurred in the moving portion. Also, in the nonlinear limiter 7, the S/N improving amount may be changed in response to the control signal output from the S/N improving amount control signal producing circuit 118. As shown in FIG. 4, as long as the value of the S/N improving amount control signal is decreased, the output range of the nonlinear limiter 7 becomes narrower. Accordingly, the S/N improving amount becomes small and the leaving picture trail would be reduced.

Next, an explanation is made of a producing operation of the YC level controlling/fixing signal by which the output from the S/N improving amount control signal producing circuit is controlled. The first counter 114 counts up the number of pixels of the signal per one field, among the signals detected by the low level signal detecting circuit 131. At the same time, the second counter 115 counts up the number of pixels of the signal having the low level per one field, among the signals detected by the high frequency range component detecting circuit 132. A ratio of the outputs derived from these first and second counters is calculated by the divider 116. The divider output is compared with a preset threshold value by the threshold value circuit 117 and a binary signal is output as the YC level controlling/fixing signal. In this embodiment, the threshold value circuit 117 outputs a 0 (zero) when the pixel number of the high frequency range component with the low level per one field is larger than the preset threshold value, and outputs a 1 (one) when this pixel number is smaller than the preset threshold value.

As previously explained with reference to the first embodiment of the third invention, the S/N improving amount control signal producing circuit 118 for controlling the nonlinear limiter 7 to vary the S/N improving amount causes the output as shown in FIG. 12 to be outputs from the output terminal 129 as the output signal of the S/N improving amount control signal producing circuit 118.

As previously explained, in accordance with this embodiment, based upon the characteristic of the S/N improving amount control signal processing circuit 118, the S/N improving amount of such a region where the level of the luminance signal is low and the saturation of the color signal is low is made smaller than that of such a region where the level of the luminance signal is high and the saturation of the color signal is high. Accordingly, in the region where the level is low and the signal cannot be easily discriminated from the noise, the S/N improving amount is reduced, so that the leaving picture trail caused by the noise reducer is suppressed, whereas in the region where the luminance signal level is high and the color saturation is high, the S/N improving effects can be properly achieved. In addition, since the proper control by the level of the signal is interrupted only when the ratio of the high frequency range component in the low-leveled region is low, a sufficient S/N improvement can be achieved over the entire screen while preventing the high frequency range component of the low-leveled region from being deteriorated. For instance, even when the pixel number of the high frequency range component with the low level over the entire screen is small, if the ratio within the low-leveled region is high, then the S/N improving amount of this region can be suppressed to the low amount. Therefore, the blur in the high frequency range component can be suppressed.

Now, an embodiment of a fifth invention will be described.

Figure 14:
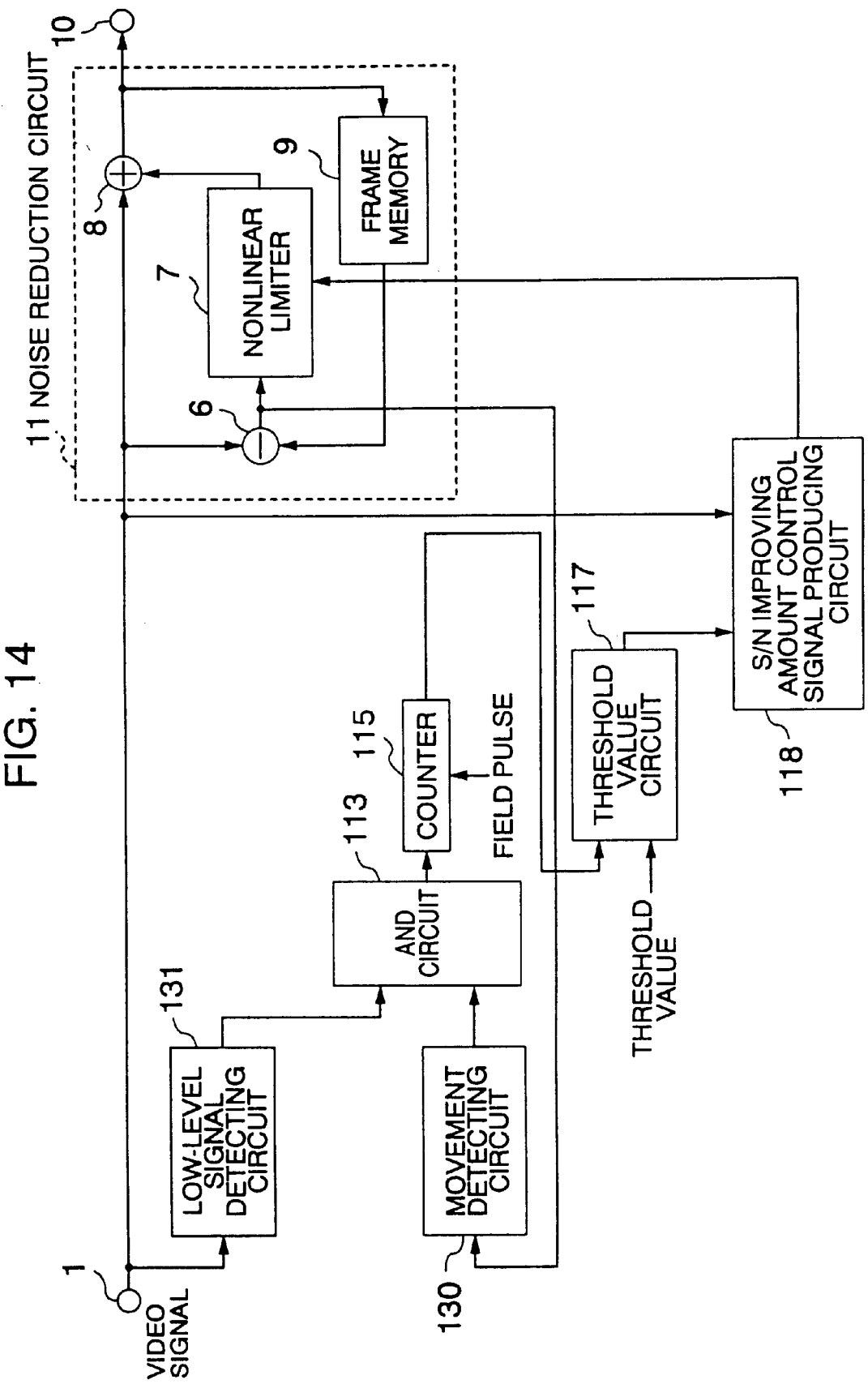
FIG. 14 is a schematic block diagram representing a noise reduction apparatus according to a first embodiment of a fifth invention.

FIG. 14 is a schematic block diagram for showing a noise reduction apparatus according to the embodiment of the fifth invention. In FIG. 14, reference numeral 1 indicates an input terminal used to input a video signal, reference numeral 118 denotes an S/N improving amount control signal producing circuit for outputting a nonlinear signal with respect to the input signal, reference numeral 6 is a subtracter, reference numeral 7 shows a nonlinear limiter, and reference numeral 8 represents an adder. Also, reference numeral 9 is a frame memory for storing one frame picture, reference numeral 10 is an output terminal for outputting a signal whose noise component has been reduced, and reference numeral 11 indicates a IIR type noise reducing circuit whose S/N improving amount is variable. Reference numeral 131 shows a low level detecting circuit for outputting a signal only when a pixel of a Y signal among the entered video signal is smaller than a constant level, reference numeral 130 shows a movement detecting circuit receiving the output of the subtracter 6 corresponding to the inter frame difference signal of the input signal, and a signal only when the inter frame difference signal is higher than or equal to a constant level; and reference numeral 113 is an AND gate circuit for AND-gating the output of the low level detecting circuit 131 and the output of the movement detecting circuit 130 and for outputting a signal only which an input signal has a low level movement component. Reference numeral 115 denotes a counter for counting the number of output signal from the AND gate circuit 113 per 1 field, and reference numeral 117 shows a threshold value circuit for outputting a 0 (zero) as a YC level controlling/fixing signal when the count output of the counter 115 exceeds a threshold value, and for outputting 1 (one) as the YC level controlling/fixing signal when the count output of the counter 115 does not exceed this threshold value. In FIG. 11, there is shown a schematic block diagram of an arrangement of the S/N improving amount control signal producing circuit 118 of FIG. 14. Since the arrangement and operative of FIG. 11 is completely similar to that of the previously explained embodiment, explanations thereof are omitted here. A characteristic of the nonlinear limiter 7 in FIG. 14 is shown in FIG. 4. As to the noise reduction apparatus with the above-explained arrangement according to this embodiment, operations thereof will now be explained. It should be noted that the same reference numerals used in the previous embodiment will be employed as those for denoting the same or similar circuit elements.

The noise reducing circuit 11 corresponds to the IIR type noise reducer with employment of the inter frame difference signal, as previously explained in the first embodiment of the first invention. When the inter frame difference signal is small, the output signal is regarded as noise so that the noise reducing process is carried out. When the inter frame difference signal is large, the output signal is regarded as movement, so that no noise reducing process is carried out in order to prevent a leaving picture trail occurred in the moving portion. Also, in the nonlinear limiter 7, the S/N improving amount may be changed in response to the control signal outputted from the S/N improving amount control signal producing circuit 118. As shown in FIG. 4, as long as the value of the S/N improving amount control signal is decreased, the output range of the nonlinear limiter 7 becomes narrower. Accordingly, the S/N improving amount becomes small and the leaving picture trail would be reduced.

Next, an explanation is made of a producing operation of the YC level controlling/fixing signal by which the output from the S/N improving amount control signal producing circuit is controlled. The counter 115 counts up the number of pixels of the signal having the low level per one field, among the signals detected by the movement detecting circuit 130. The output counter 115 is compared with a preset threshold value by the threshold value circuit 117 and a binary signal is outputted as the YC level controlling/fixing signal. In this embodiment, the threshold value circuit 117 outputs a 0 (zero) when the pixel number of the movement with the low level per one field is larger than the preset threshold value, and outputs a 1 (one) when this pixel number is smaller than the preset threshold value.

Referring now to the drawing, as to the operation of the S/N improving amount control signal producing circuit 118 for producing such a control signal used to control the nonlinear limiter 7 so as to vary the S/N improving amount, this operation is completely similar to that of the first embodiment of the third invention. As represented in FIG. 12, when the YC level controlling/fixing signal is equal to 1 (one), the control signal outputted from the S/N improving amount control signal producing circuit 118 is fixed.

As previously explained, in accordance with this embodiment, based upon the characteristic of the S/N improving amount control signal processing circuit 118, the S/N improving amount of such a region where the level of the luminance signal is low and the saturation of the color signal is low is made smaller than that of such a region where the level of the luminance signal is high and the saturation of the color signal is high. Accordingly, in the region where the level is low and the signal cannot be easily discriminated from the noise, the S/N improving amount is reduced, so that the leaving picture trail caused by the noise reducer is suppressed, whereas in the region where the luminance signal level is high and the color saturation is high, the S/N improving effects can be properly achieved. In addition, in the case that there is a small pixel number of the movement with the low level in 1 field, since the leaving picture trail caused by the noise reduction can hardly occur, the proper control by the signal level is interrupted, whereby the S/N ratio of the entire screen can be improved.

Now, an embodiment of a sixth invention will be described.

Figure 15:
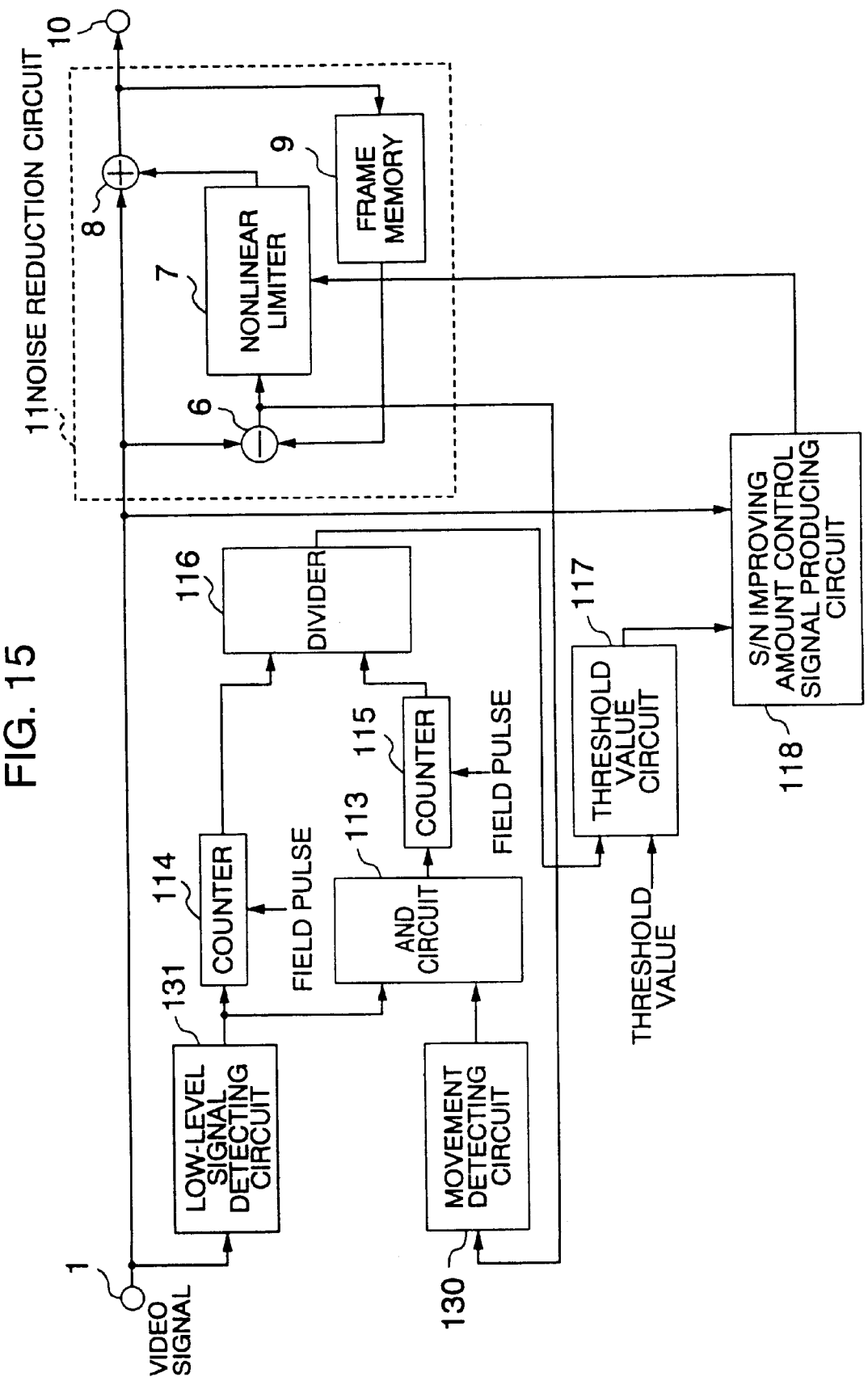
FIG. 15 is a schematic block diagram indicating a noise reduction apparatus according to a first embodiment of a sixth invention.

FIG. 15 is a schematic block diagram for showing a noise reduction apparatus according to the embodiment of the six invention. In FIG. 15, reference numeral 1 indicates an input terminal used to input a video signal, reference numeral 118 denotes an S/N improving amount control signal producing circuit for outputting a nonlinear signal with respect to the input signal, reference numeral 6 is a subtracter, reference numeral 7 shows a nonlinear limiter, and reference numeral 8 represents an adder. Also, reference numeral 9 is a frame memory for storing a one frame picture, reference numeral 10 is an output terminal for outputting a signal whose noise component has been reduced, and reference numeral 11 indicates a IIR type noise reducing circuit whose S/N improving amount is variable. Reference numeral 131 shows a low level detecting circuit for outputting a signal only when a pixel of a Y signal among the entered video signal is smaller than a constant level, and reference numeral 113 is an AND gate circuit for AND-gating the output of the low level detecting circuit 131 and the output of the movement detecting circuit 130 and for outputting a signal only which an input signal has a low level and a high frequency range component. Reference numeral 114 denotes a first counter for counting the number of output signals derived from the low level signal detecting circuit 131 per one field, reference numeral 115 is a second counter for counting the number of output signal derived from the AND gate circuit 113 per one field, reference numeral 116 is a divider for dividing the output of the second counter 115 by the output of the first counter 114, and reference numeral 117 shows a threshold value circuit for outputting a 0 (zero) as a YC level controlling/fixing signal when the output of the divider 116 exceeds a threshold value, and for outputting a 1 (one) as a YC level controlling/fixing signal when the output of the divider 116 does not exceed this threshold value. In FIG. 11, there is shown a schematic block diagram of an arrangement of the S/N improving amount control signal producing circuit 118 of FIG. 15. Since the arrangement of FIG. 11 is completely similar to that as previously explained, an explanation thereof is omitted here. A characteristic of the nonlinear limiter 7 in FIG. 15 is represented in FIG. 4. In the noise reduction apparatus with the above-described arrangement according to this embodiment, operation thereof will now be described. It should be noted that the same reference numerals shown in the previous embodiment are employed as those for indicating similar or same circuit elements.

The noise reducing circuit 11 corresponds to the IIR type noise reducer with employment of the inter frame difference signal, as previously explained in the first embodiment of the first invention. When the inter frame difference signal is small, the output signal is regarded as noise so that the noise reducing process is carried out. When the inter frame difference signal is large, the output signal is regarded as movement, so that no noise reducing process is carried out in order to prevent a leaving picture trail occurred in the moving portion. Also, in the nonlinear limiter 7, the S/N improving amount may be changed in response to the control signal outputted from the S/N improving amount control signal producing circuit 118. As shown in FIG. 4, as long as the value of the S/N improving amount control signal is decreased, the output range of the nonlinear limiter 7 becomes narrower. Accordingly, the S/N improving amount becomes small and the leaving picture trail would be reduced.

Next, an explanation is made of a producing operation of the YC level controlling/fixing signal by which the output from the S/N improving amount control signal producing circuit is controlled. The first counter 114 counts up the number of pixels of the signal per one field, among the signals detected by the high frequency component detecting circuit 131. At the same time, the second counter 115 counts up the number of pixels of the signal having the low level per one field, among the signals detected by the movement detecting circuit 130. A ratio of the outputs derived from these first and second counters is calculated by the divider 116. The output of divider 116 is compared with a preset threshold value by the threshold value circuit 117 and a binary signal is outputted as the YC level controlling/fixing signal. In this embodiment, the threshold value circuit 117 outputs a 0 (zero) when the movement ratio of the low-leveled range component with the low level per one field is larger than the preset threshold value, and outputs a 1 (one) when this movement ratio is smaller than the preset threshold value.

As to the operation of the S/N improving amount control signal producing circuit 118 for producing such a control signal used to control the nonlinear limiter 7 so as to vary the S/N improving amount, this operation is completely similar to that of the first embodiment of the third invention. As represented in FIG. 12, when the YC level controlling/fixing signal is equal to 1 (one), the control signal outputted from the S/N improving amount control signal producing circuit 118 is fixed.

As previously explained, in accordance with this embodiment, based upon the characteristic of the S/N improving amount control signal processing circuit 118, the S/N improving amount of such a region where the level of the luminance signal is low and the saturation of the color signal is low is made smaller than that of such a region where the level of the luminance signal is high and the saturation of the color signal is high. Accordingly, in the region where the level is low and the signal cannot be easily discriminated from the noise, the S/N improving amount s reduced, so that the leaving picture trail caused by the noise reducer is suppressed, whereas in the region where the luminance signal level is high and the color saturation is high, the S/N improving effects can be properly achieved. In addition, since the proper control by the level of the signal is interrupted only when the ratio of the movement component in the low-leveled region is low, a sufficient S/N improvement can be achieved over the entire screen while preventing the high frequency range component of the low-leveled region from being deteriorated. For instance, even when the pixel number of the movement component with the low level over the entire screen is small, if the ratio within the low-leveled region is high, then the S/N improving amount of this region can be suppressed to the low amount. Therefore, the blur in the high frequency range component can be suppressed.

Now, an embodiment of a seventh invention will be described.

Figure 16:
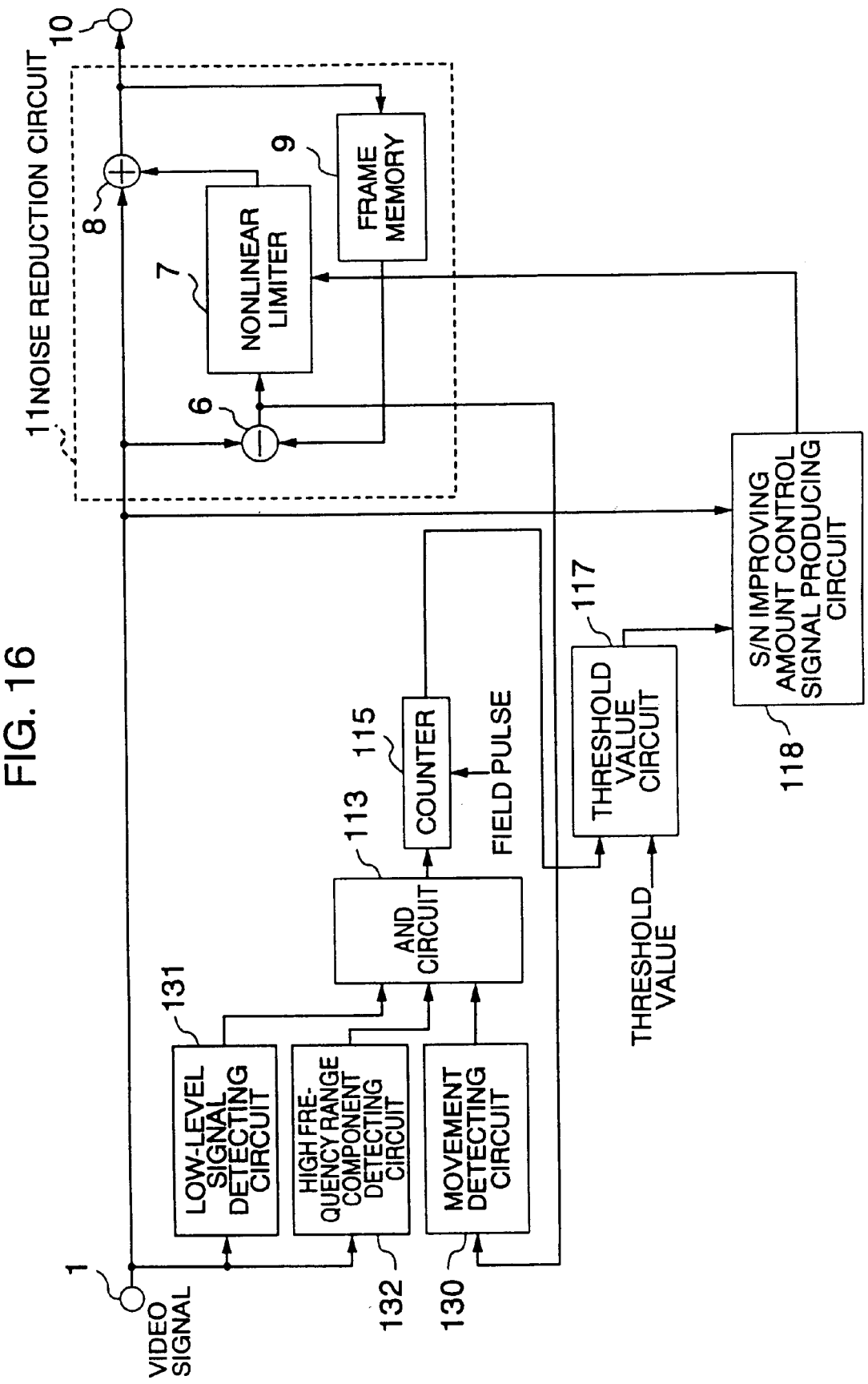
FIG. 16 is a schematic block diagram representing a noise reduction apparatus according to a first embodiment of a seventh invention.

FIG. 16 is a schematic block diagram showing a noise reduction apparatus according to the embodiment of the seventh invention. In FIG. 16, reference numeral 1 indicates an input terminal used to input a video signal, reference numeral 118 denotes an S/N improving amount control signal producing circuit for outputting a nonlinear signal with respect to the input signal, reference numeral 6 is a subtracter, reference numeral 7 shows a nonlinear limiter, and reference numeral 8 represents an adder. Also, reference numeral 9 is a frame memory for storing a one frame picture, reference numeral 10 is an output terminal for outputting a signal whose noise component has been reduced, and reference numeral 11 indicates a IIR type noise reducing circuit whose S/N improving amount is variable. Reference numeral 131 shows a low level detecting circuit for outputting a signal only when a pixel of a Y signal among the entered video signal is smaller than a constant level, reference numeral 132 indicates a high-frequency range component detecting circuit for outputting a signal only when a detection is made of a high frequency range component of the Y signal among the entered video signal and an absolute value of the high frequency range component is higher than, or equal to a constant level, reference numeral 130 denotes a movement detecting circuit for outputting a signal only when the output from the subtracter 6 corresponding to the inter frame difference signal of the input signal is fed therein as an input and the inter frame difference signal is higher than, or equal to a constant level, and reference numeral 113 is an AND gate circuit for AND-gating the output of the low level detecting circuit 131 the output of the high-frequency range component detecting circuit 132 and also the output of the movement detecting circuit 130, and for outputting a signal only which an input signal has a low level and a high frequency range component. Reference numeral 115 denotes a counter for counting the number of output signals from the AND gate circuit 113 per one field, and reference numeral 117 shows a threshold value circuit for outputting a 0 (zero) as a YC level controlling/fixing signal when the count output of the counter 115 exceeds a threshold value, and for outputting a 1 (one) as the YC level controlling/fixing signal when the count output of the counter 115 does not exceed this threshold value. In FIG. 11, there is shown a schematic block diagram of an arrangement of the S/N improving amount control signal producing circuit 118 in FIG. 16. Since the arrangement of the circuit of FIG. 11 is completely similar to that as previously explained, an explanation thereof is omitted here. A characteristic of the nonlinear limiter 7 shown in FIG. 16 is represented in FIG. 4. In the noise reduction apparatus with the above-described arrangement according to this embodiment, operations thereof will now be described. It should be understood that the same reference numerals shown in the previous embodiment are employed as those for indicating similar or same circuit elements.

The noise reducing circuit 11 corresponds to the cyclic type noise reducer with employment of the inter frame difference signal, as previously explained in the first embodiment of the first invention. When the inter frame difference signal is small, the output signal is regarded as noise so that the noise reducing process is carried out. When the inter frame difference signal is large, output signal is regarded as the movement, so that no noise reducing process is carried out in order to prevent a leaving picture trail occurred in the moving portion. Also, in the nonlinear limiter 7, the S/N improving amount may be changed in response to the control signal outputted from the S/N improving amount control signal producing circuit 118. As shown in FIG. 4, as long as the value of the S/N improving amount control signal is decreased, the output range of the nonlinear limiter 7 becomes narrow. Accordingly, the S/N improving amount becomes small and the leaving picture trail would be reduced.

Next, an explanation is made of a producing operation of the YC level controlling/fixing signal by which the output from the S/N improving amount control signal producing circuit is controlled. The AND gate circuit 113 outputs a signal only when the input signal owns a low level and also the movement of the high frequency range component, and the number of pixels contained in 1 field is counted. The output of counting 115 is compared with a preset threshold value by the threshold value circuit 117 and a binary signal is outputted as the YC level controlling/fixing signal. In this embodiment, the threshold value circuit 117 outputs a 0 (zero) when the pixel number of the high frequency range component with the low level per one field is larger than the preset threshold value, and outputs a 1 (one) when this pixel number is smaller than the preset threshold value. As to the operation of the S/N improving amount control signal producing circuit 118 for producing such a control signal used to control the nonlinear limiter 7 so as to vary the S/N improving amount, this operation is completely similar to that of the first embodiment of the third invention. As represented in FIG. 12, when the YC level controlling/fixing signal is equal to 1 (one), the control signal outputted from the S/N improving amount control signal producing circuit 118 is fixed.

As previously explained, in accordance with this embodiment, based upon the characteristic of the S/N improving amount control signal processing circuit 118, the S/N improving amount of such a region where the level of the luminance signal is low and the saturation of the color signal is low is made smaller than that of such a region where the level of the luminance signal is high and the saturation of the color signal is high. Accordingly, in the region where the level is low and the signal cannot be easily discriminated from the noise, the S/N improving amount is reduced, so that the leaving picture trail caused by the noise reducer is suppressed, whereas in the region where the luminance signal level is high and the color saturation is high, the S/N improving effects can be properly achieved. In addition, in the case that there is a small pixel number of the movement of the high frequency range component with the low level in one field, since the leaving picture trail caused by the noise reduction can hardly occur, the proper control by the signal level is interrupted, whereby the S/N ratio of the entire screen can be improved.

As a consequence, even when the input signal contains the movement in the low level, if this input signal does not contains many of the high frequency range components, then the S/N improving amount suppression by the YC level is prohibited. Accordingly, the improving amount can be increased, as compared in such a case that the S/N improving amount control signal producing amount 118 is controlled only by the movement with the low level.

Now, an embodiment of an eighth invention will be described.

Figure 17:
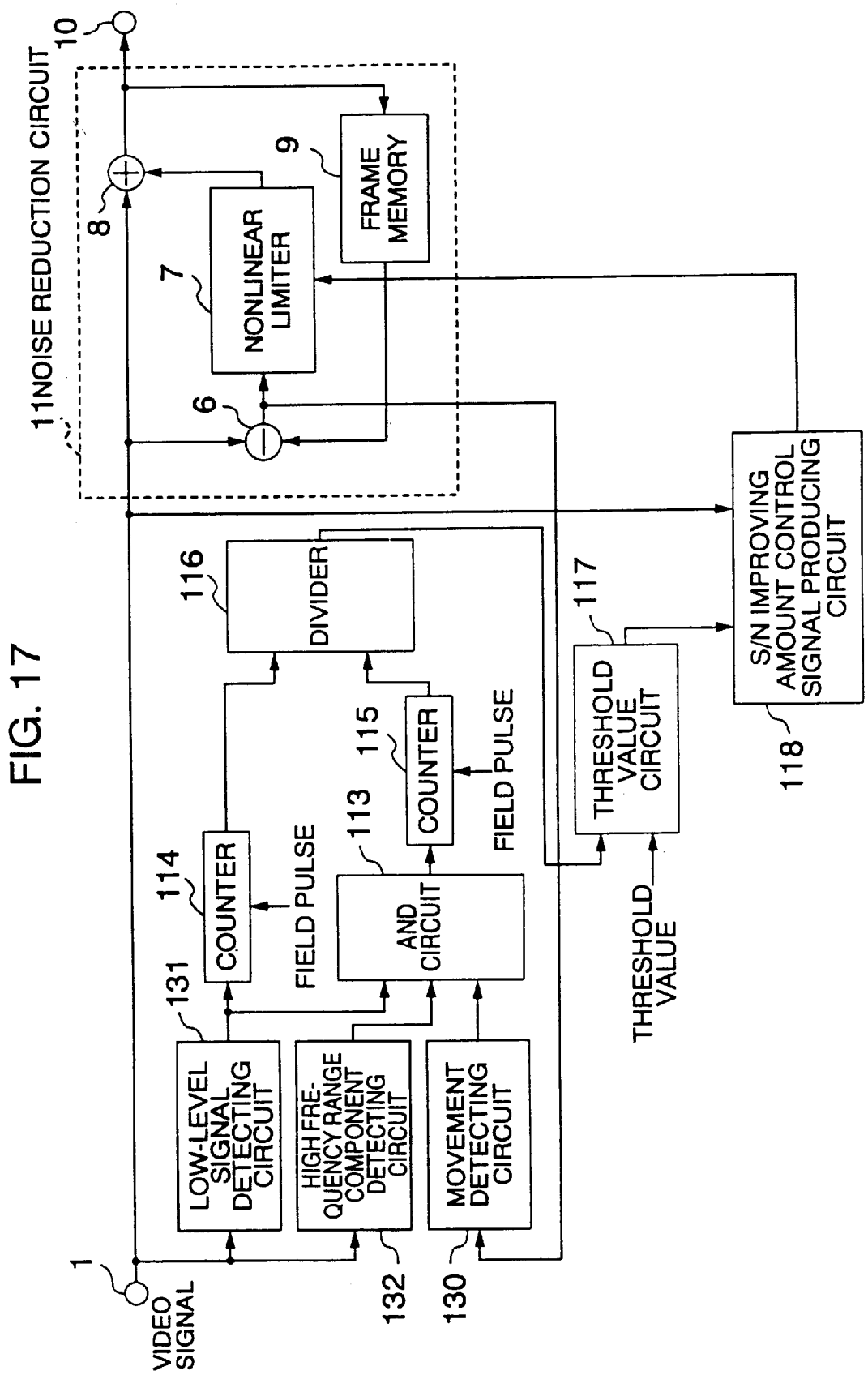
FIG. 17 is a schematic block diagram indicating a noise reduction apparatus according to a first embodiment of an eight invention.
Figure 18:
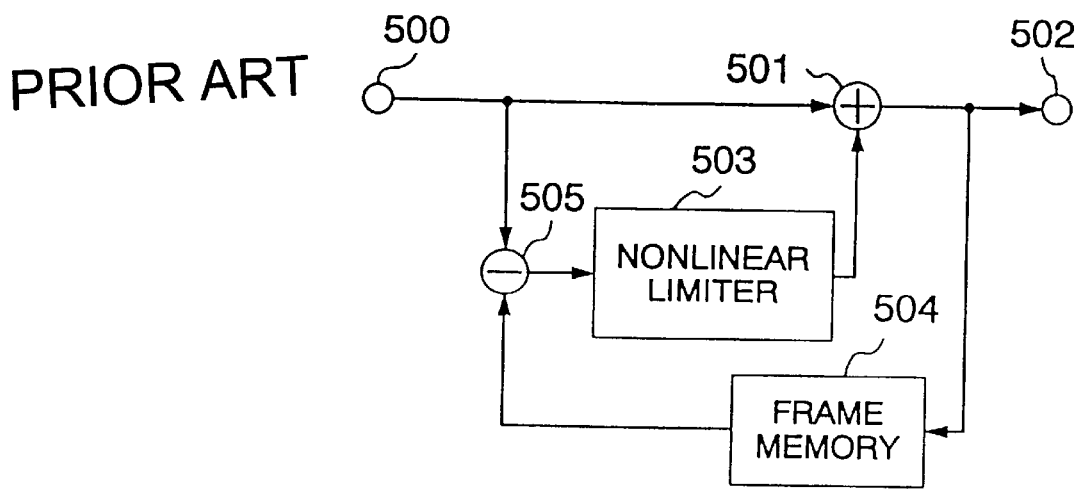
FIG. 18 is a schematic block diagram representing a conventional noise reduction apparatus.
Figure 19:
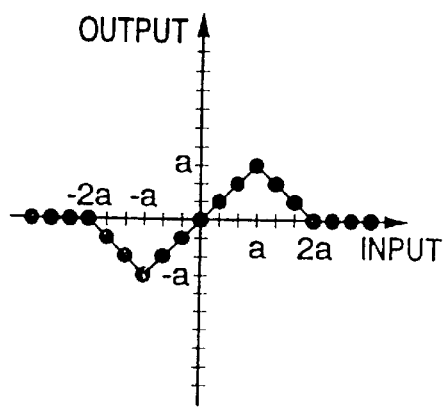
FIG. 19 shows the input/output characteristic of the nonlinear limiter employed in the conventional noise reduction apparatus.
Figure 20:
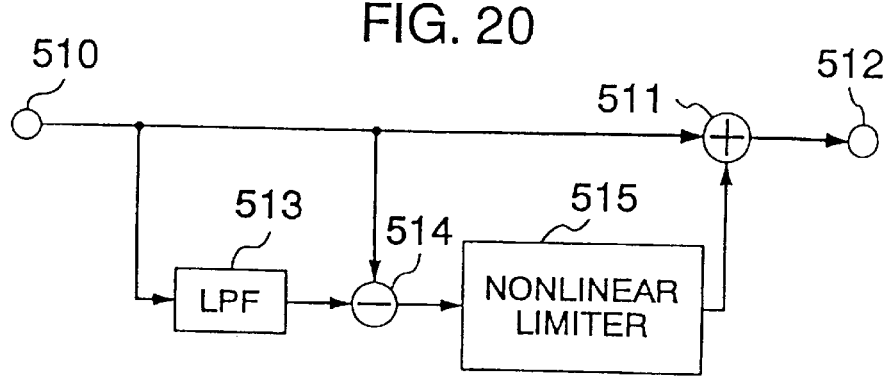
FIG. 20 is a schematic block diagram for representing another conventional noise reduction apparatus.

FIG. 17 is a schematic block diagram showing a noise reduction apparatus according to the embodiment of the eighth invention. In FIG. 17, reference numeral 1 indicates an input terminal used to input a video signal, reference numeral 118 denotes an S/N improving amount control signal producing circuit for outputting a nonlinear signal with respect to the input signal, reference numeral 6 is a subtracter, reference numeral 7 shows a nonlinear limiter, and reference numeral 8 represents an adder. Also, reference numeral 9 is a frame memory for storing a one frame picture, reference numeral 10 is an output terminal for outputting a signal whose noise component has been reduced, and reference numeral 11 indicates a IIR type noise reducing circuit whose S/N improving amount is variable. Reference numeral 131 shows a low level detecting circuit for outputting a signal only when a pixel of a Y signal among the entered video signal is smaller than a constant level, reference numeral 132 indicates a high-frequency range component detecting circuit for outputting a signal only when a detection is made of a high frequency range component of the Y signal among the entered video signal and an absolute value of the high frequency range component is higher than, or equal to a constant level, reference numeral 130 denotes a movement detecting circuit for outputting a signal only when the output from the subtracter 6 corresponding to the inter frame difference signal of the input signal is fed thereat as an input and the inter frame difference signal is higher than, or equal to a constant level, and reference numeral 113 is an AND gate circuit for AND-gating the output of the low level detecting circuit 131, the output of the high-frequency range component detecting circuit 132 and the output from the movement detecting circuit 130, and for outputting a signal only which an input signal has a low level and a high frequency range component. Reference numeral 114 denotes a first counter for counting the number of output signal derived from the low level signal detecting circuit 131 per one field, reference numeral 115 is a second counter for counting the number of output signal derived from the AND gate circuit 113 per one field reference numeral 116 is, a divider for dividing the output of the second counter 115 by the output of the first counter 114, and reference numeral 117 shows a threshold value circuit for outputting 0 (zero) as a YC level controlling/fixing signal when the output of the divider 116 exceeds a threshold value, and for outputting a 1 (one) as the YC level controlling/fixing signal when the output of the divider 116 does not exceed this threshold value. In FIG. 11, there is shown a schematic block diagram of an arrangement of the S/N improving amount control signal producing circuit 118 of FIG. 17. Since the arrangement of the circuit of FIG. 11 are completely similar to that as previously explained, an explanation thereof is omitted here. A characteristic of the nonlinear limiter 7 shown in FIG. 17 is represented in FIG. 4. In the noise reduction apparatus with the above-described arrangement according to this embodiment, operations thereof will now be described. It should be understood that the same reference numerals shown in the previous embodiment are employed as those for indicating similar or same circuit elements.

The noise reducing circuit 11 corresponds to the IIR type noise reducer with employment of the inter frame difference signal, as previously explained in the first embodiment of the first invention. When the inter frame difference signal is small, the output signal is regarded as noise so that the noise reducing process is carried out. When the inter frame difference signal is large, the output signal is regarded as movement, so that no noise reducing process is carried out in order to prevent a leaving picture trail occurred in the moving portion. Also, in the nonlinear limiter 7, the S/N improving amount may be changed in response to the control signal outputted from the S/N improving amount control signal producing circuit 118. As shown in FIG. 4, as long as the value of the S/N improving amount control signal is decreased, the output range of the nonlinear limiter 7 becomes narrower. Accordingly, the S/N improving amount becomes small and the leaving picture trail would be reduced.

Next, an explanation is made of a producing operation of the YC level controlling/fixing signal by which the output from the S/N improving amount control signal producing circuit is controlled. The first counter 114 counts up the number of pixels of the signal per one field, among the signals detected by the low level signal detecting circuit 132. At the same time, the AND gate circuit 113 outputs a signal only when the input signal has a low level and also the movement of the high frequency range component, and then the number of pixels contained in one frame is counted by the second counter 115. A ratio of the outputs from these counters is calculated by the divider 116. The divider output is compared with a preset threshold value by the threshold value circuit 117 and a binary signal is output as the YC level controlling/fixing signal. In this embodiment, the threshold value circuit 117 outputs a 0 (zero) when the pixel number of the high frequency range component with the low level per one field is larger than the preset threshold value, and outputs a 1 (one) when this pixel number is smaller than the preset threshold value.

As to the operation of the S/N improving amount control signal producing circuit 118 for producing such a control signal used to control the nonlinear limiter 7 so as to vary the S/N improving amount, this operation is completely similar to that of the first embodiment of the third invention. As represented in FIG. 12, when the YC level controlling/fixing signal is equal to 1 (one), the control signal outputted from the S/N improving amount control signal producing circuit 118 is fixed.

As previously explained, in accordance with this embodiment, based upon the characteristic of the S/N improving amount control signal processing circuit 118, the S/N improving amount of such a region where the level of the luminance signal is low and the saturation of the color signal is low is made smaller than that of such a region where the level of the luminance signal is high and the saturation of the color signal is high. Accordingly, in the region where the level is low and the signal cannot be easily discriminated from the noise, the S/N improving amount is reduced, so that the leaving picture trail caused by the noise reducer is suppressed, whereas in the region where the luminance signal level is high and the color saturation is high, the S/N improving effects can be properly achieved. In addition, since the proper control by the level of the signal is interrupted only when the ratio of the high frequency range component in the low-leveled region is low, a sufficient S/N improvement can be achieved over the entire screen while preventing the high frequency range component of the low-leveled region from being deteriorated.

As a consequence, even when the input signal contains the movement in the low level, if this input signal does not contains any of the high frequency range components, then the S/N improving amount suppression by the YC level is prohibited. Accordingly, the improving amount can be increased, as compared in such a case that the S/N improving amount control signal producing amount 118 is controlled only by the movement with the low level. Also, even when the number of pixels of the movement component in the high frequency range with the low level is smaller over the entire screen, if the ratio within the region of the low level is large, then the S/N improving amount of this region may be suppressed to be a small value, so that the blur of the movement component in the high frequency range can be suppressed.

It should be noted that although the characteristic of the YC level circuit is such a characteristic that as shown in FIG. 3, the signal is outputted by entering both the Y signal and the C signal in each of the above-explained embodiments, alternatively, a characteristic of this YC level circuit may be defined by outputting such a signal based only upon either the Y signal, or the C signal. Also, the embodiments subsequent to the second invention are such that the present invention has been applied to the frame IIR type noise reducers. Similar to the first invention, the present invention may be applied to a frame FIR type noise reducer, and a noise coring circuit without employing a frame memory. The structure of the noise reducer, the signal to which the noise reduction is performed (Y signal in the embodiment), and the S/N improving amount control method are not limited to those as described in the respective embodiments. Other arrangements may be employed whose S/N improving amounts can be externally controlled. Also, the present invention is not limited to the characteristic of the nonlinear limiter shown in FIG. 4, but may be applied to other characteristics of the nonlinear limiter whose S/N improving amount may be varied, or may includes 0 (zero). The outputs and the bit numbers related to the above-described Y threshold value circuits 35, 68, 125, the C threshold value circuits 36, 69, 126, the high frequency range component threshold value circuit 70, the high frequency range component detecting circuit 132, the movement detecting circuit 130, and the threshold value circuit 117 are not restricted to those disclosed in the respective embodiments. Moreover, the output characteristics of the YC level circuits 37, 71, 127, and the bit numbers thereof are not limited to those described in the respective embodiments. Alternatively, many other circuits will be employed if these circuits may produce such a signal capable of changing the S/N improving amount of the noise reducing circuit. Furthermore, the circuit portion for performing the binary process may be substituted by another circuit portion for executing the multi-level process. The arrangements of the low-pass filter 52, the high-pass filter 61, and the high frequency range component detecting circuit 132 may be made so as to obtain any of the frequency components in the horizontal direction, the vertical direction, and the horizontal/vertical directions. Also, the movement detecting methods and the methods for detecting the movement of the high frequency range component, as described in the fifth, sixth, seventh and eighth invention, are not restricted to those of the embodiments. Alternatively, a similar effect may be achieved by obtaining the movement detecting methods by way of, for instance, the frequency separations such as the Hadamard transformation. Although the movement signal and the high frequency range component signal are separately detected to obtain the movement of the high frequency range component in the embodiments of the seventh and eighth inventions, other arrangements capable of detecting the movement of the high frequency range component may be employed. For instance, a high frequency range component detecting circuit may be provided at the output of the movement detecting circuit, so that the movement of the high frequency range component may be detected. Also, in the embodiments of the third, fourth, fifth, sixth, seventh, and eighth invention, assuming that the input video signal corresponds to the interlaced signal, the counters 114 and 115 are arranged so as to count up the pixel number in unit of one field. Alternatively, the input signal is not limited to this interlaced signal, but the video section where the pixel number is counted may be an arbitrary region. Otherwise, an arbitrary field number and an arbitrary frame number may be introduced. In the embodiments of the third, fourth, fifth, sixth, seventh, and eighth invention, the output from the S/N improving amount control signal producing circuit 118 is controlled by the threshold value circuit 117 in units of one field. Alternatively, as to a pixel of a high-leveled signal, namely a bright region, another process for increasing an S/N improving amount may be additionally employed in the S/N improving amount control signal producing circuit 118.

What is claimed is:

1. A noise reduction apparatus comprising:

noise reducing means for receiving a video signal and whose S/N improving amount is variable with respect to the received video signal;

S/N improving amount control signal producing means for receiving said video signal and for outputting a signal in response to a signal level of said video signal every pixel; and S/N improving amount gating means for receiving said video signal and for controlling said S/N improving amount control signal producing means; and wherein:

the S/N improving amount of said noise reducing means is controlled by the output from said S/N improving amount control signal producing means; and said S/N improving amount gating means includes a low-level-region movement detecting means for detecting a movement region within a low level region of the input signal of said S/N improving amount gating means.

2. A noise reduction apparatus as claimed in claim 1 wherein:

said low-level-region movement detecting means includes:

low level signal detecting means for receiving a luminance signal and for outputting a luminance signal having a level lower than a preselected value;

movement detecting means for detecting a movement within at least one field period;

logic means for receiving both the output from said low level signal detecting means and the output from said movement detecting means;

a counter for receiving output signals from said logic means so as to count a quantity of the output signals from the logic means in a preselected video section; and threshold value means for receiving the output from said counter and for comparing said output from the counter with a preselected value to thereby output a large/small relationship.

3. A noise reduction apparatus as claimed in claim 1 wherein:

said low-level-region movement detecting means includes:

low level signal detecting means for receiving a luminance signal and for outputting a luminance signal having a level lower than the preselected value;

a first counter for receiving the output from said low level signal detecting means and for counting a quantity of pixels whose level is judged as a low level within a preselected video section;

movement detecting means for detecting a movement within at least one field period;

logic means for receiving both the output from said low level signal detecting means and the output from said movement detecting means;

a second counter for receiving output signals from said logic means so as to count a quantity of the output signals from said logic means within the preselected video section;

dividing means for receiving both the output from said first counter and the output from said second counter to thereby calculate a ratio of both the outputs from said first and second counters; and threshold value means for receiving the output from said dividing means and for comparing the output from said dividing means with a predetermined value to thereby output a large/small relationship.

4. A noise reduction apparatus as claimed in claim 2 wherein:

said logic means outputs a signal only when the input signal to said logic means has a low level and also a movement is detected; and the output from said S/N improving amount control signal producing means is controlled such that the S/N improving amount is increased based upon the output of said threshold value means.

5. A noise reduction apparatus as claimed in claim 3 wherein:

said logic means outputs a signal only when the input signal to said logic means has a low level and also a movement is detected; and the output from said S/N improving amount control signal producing means is controlled such that the S/N improving amount is increased based upon the output of said threshold value means.

* * * * *